US008471856B2

(12) United States Patent
Stamm et al.

(10) Patent No.: US 8,471,856 B2
(45) Date of Patent: *Jun. 25, 2013

(54) RENDERING STROKE PAIRS FOR GRAPHICAL OBJECTS

(75) Inventors: Beat Stamm, Redmond, WA (US); Michael J. Duggan, Kirkland, WA (US); Gregory C. Hitchcock, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/593,972

(22) Filed: Aug. 24, 2012

(65) Prior Publication Data

US 2012/0320065 A1 Dec. 20, 2012

Related U.S. Application Data

(63) Continuation of application No. 11/751,325, filed on May 21, 2007, now Pat. No. 8,253,742, which is a continuation-in-part of application No. 11/566,598, filed on Dec. 4, 2006, now abandoned, which is a continuation of application No. 10/856,641, filed on May 28, 2004, now Pat. No. 7,256,786.

(51) Int. Cl.
*G06T 11/00* (2006.01)

(52) U.S. Cl.
USPC .......................................................... 345/469

(58) Field of Classification Search
None
See application file for complete search history.

(56) References Cited

U.S. PATENT DOCUMENTS

| 5,155,805 A | 10/1992 | Kaasila |
| 5,280,576 A | 1/1994 | Cao |
| 5,319,358 A | 6/1994 | Martinez |
| 5,355,449 A | 10/1994 | Lung |
| 5,473,709 A | 12/1995 | Aoki |
| 5,500,927 A | 3/1996 | Sander-Cederlof |
| 5,577,170 A | 11/1996 | Karow |
| 5,594,855 A | 1/1997 | Von Ehr |
| 5,684,510 A | 11/1997 | Brassell |
| 5,777,627 A | 7/1998 | Takazawa |
| 5,790,126 A | 8/1998 | Ballard |
| 5,850,488 A | 12/1998 | Asai |

(Continued)

FOREIGN PATENT DOCUMENTS

WO WO98/36630 8/1998

OTHER PUBLICATIONS

Zongker, Douglas E., "Example-Based Hinting of True Type Fonts" Computer Graphics, Siggraph 2000 Conference Proceedings, New Orleans, LA, Jul. 23-28, 2000.

(Continued)

*Primary Examiner* — Edward Martello
(74) *Attorney, Agent, or Firm* — Workman Nydegger

(57) ABSTRACT

The principles of the present invention relate to rendering stroke pairs. A graphical object includes at least a first stroke and a second similarly oriented second stroke collectively representing a stroke pair. A calculated distance between the first stroke and the second stroke is constrained (e.g., to a center line between the strokes) to mitigate the possibility of rounding errors causing the represented stroke pair to be inappropriately rendered. After the stroke pair is constrained, controls points of the individual strokes can be adjusted so that the individual strokes are appropriately rendered at their respective constrained locations. The adjusted stroke pair is constrained between external reference points for appropriate rendering relative to other graphical objects. The graphical object, including the adjusted constrained stroke pair, is rendered at an output device.

14 Claims, 15 Drawing Sheets

U.S. PATENT DOCUMENTS

| | | | |
|---|---|---|---|
| 5,852,448 | A | 12/1998 | Cheng |
| 5,857,067 | A | 1/1999 | Hassett |
| 6,069,554 | A | 5/2000 | Hoel |
| 6,151,032 | A | 11/2000 | Cheng |
| 6,157,390 | A | 12/2000 | Cheng |
| 6,249,908 | B1 | 6/2001 | Stamm |
| 6,253,374 | B1 | 6/2001 | Dresevic |
| 6,552,727 | B2 | 4/2003 | Stamm |
| 6,600,490 | B1 | 7/2003 | Brock |
| 6,654,016 | B1 | 11/2003 | Hobbs |
| 7,136,067 | B2 | 11/2006 | Stamm |
| 7,161,598 | B2 | 1/2007 | Klassen |
| 7,187,382 | B2 | 3/2007 | Stamm |
| 7,256,786 | B2 | 8/2007 | Stamm |
| 7,265,757 | B2 | 9/2007 | Stamm |
| 7,292,249 | B2 | 11/2007 | Stamm |
| 2001/0048438 | A1 | 12/2001 | Kurumida |
| 2002/0033824 | A1 | 3/2002 | Stamm |
| 2004/0212620 | A1 | 10/2004 | Dowling et al. |
| 2005/0162428 | A1 | 7/2005 | Stamm |
| 2005/0184991 | A1 | 8/2005 | Stamm |
| 2007/0080966 | A1 | 4/2007 | Stamm |
| 2007/0139412 | A1 | 6/2007 | Stamm |
| 2007/0139413 | A1 | 6/2007 | Stamm |
| 2007/0139415 | A1 | 6/2007 | Stamm |
| 2007/0216689 | A1 | 9/2007 | Stamm |

OTHER PUBLICATIONS

Stamm, Beat, "Object-orientation and extensibility in a font-scaler" Electronic Publishing, vol. 6(3), 159-170 Sep. 1993.
Stamm, Beat, "Dynamic regularization of intelligent outline fonts", Electronic Publishing, vol. 6(3), 219-230 (Sep. 1998).
Packard, Keith, "TWIN: A Window System for 'Sub-PDA' Devices", HP Cambridge Research Laboratory, 9 pages, Jul. 20-23, 2005.
U.S. Appl. No. 10/856,655, May 15, 2006, Office Action.
U.S. Appl. No. 10/856,655, Dec. 15, 2006, Office Action.
U.S. Appl. No. 10/856,655, May 25, 2007, Notice of Allowance.
U.S. Appl. No. 10/856,641, Apr. 18, 2006, Office Action.
U.S. Appl. No. 10/856,641, Sep. 21, 2006, Notice of Allowance.
U.S. Appl. No. 10/856,451, Oct. 6, 2006, Office Action.
U.S. Appl. No. 10/856,451, Apr. 4, 2007, Office Action.
U.S. Appl. No. 10/856,451, Aug. 14, 2007, Notice of Allowance.
U.S. Appl. No. 11/566,598, Oct. 3, 2008, Office Action.
U.S. Appl. No. 11/566,598, Apr. 13, 2009, Office Action.
U.S. Appl. No. 11/566,598, Sep. 24, 2009, Office Action.
U.S. Appl. No. 11/566,598, Mar. 19, 2010, Office Action.
U.S. Appl. No. 11/566,598, Dec. 22, 2010, Office Action.

RENDERING STROKE PAIRS FOR GRAPHICAL OBJECTS

CROSS-REFERENCE TO RELATED APPLICATIONS

The present application is a continuation of U.S. Application Ser. No. 11/751,325, filed May 21, 2007, now issued as U.S. Pat. No. 8,253,742, and entitled "Rendering Stroke Pairs for Graphical Objects," which is incorporated herein by reference in its entirety. That application is a continuation-in-part application of U.S. application Ser. No. 11/566,598 filed Dec. 4, 2006 now abandoned and entitled "Appropriately Rendering A Graphical Object When A Corresponding Outline Has Exact Or Inexact Control Points," which is incorporated herein by reference in its entirety. That application is a continuation application of U.S. application Ser. No. 10/856,641 filed May 28, 2004 now U.S. Pat. No. 7,256,786 and entitled "Appropriately Rendering A Graphical Object When A Corresponding Outline Has Exact Or Inexact Control Points," which is incorporated herein by reference in its entirety.

BACKGROUND OF THE INVENTION

1. The Field of the Invention

The present invention relates to rendering graphical objects such as text. More specifically, the present invention relates to appropriately rendering a graphical object when a corresponding outline has exact or inexact control points.

2. Background and Related Art

Computing technology has transformed the way we work and play. Computing systems now take a wide variety of forms including desktop computers, laptop computers, tablet PCs, Personal Digital Assistants (PDAs), and the like. Even household devices (such as refrigerators, ovens, sewing machines, security systems, and the like) have varying levels of processing capability and thus may be considered computing systems. As time moves forward, processing capability may be incorporated into a number of devices that traditionally did not have processing capability. Accordingly, the diversity of computing systems may likely increase.

Almost all computing systems that interface with human beings use a display to convey information. In many cases, the appeal of the display is considered an important attribute of the computing system. Display of textual information (e.g., Latin-based characters) typically includes processing glyphs that represent characters of a font. A glyph includes control points and instructions for connecting the control points such that an outline of a corresponding character can be generated in an arbitrary grid space (e.g., a pixel grid). Often, characters will be defined for display at a larger size and higher resolution and then mathematically scaled down (or otherwise manipulated) when the characters are to be rendered at smaller sizes and lower resolutions (or as bold, italic, etc.). Thus, a reduced number of descriptions, and potentially only one description, for a character (per font) need be stored.

To scale down a character, the location of control points can be divided by a scaling factor. For example, to scale a character down by a scaling factor of 10, the coordinates of each control point defining the character (at the higher resolution) can be divided by 10. It may be that control points defining a character for display on a 100×100 grid are to be scaled down for display on a 10×10 grid. Thus, a control point at grid position (50, 30) can be scaled down to a control point at grid position (5, 3), a control point at grid position (70, 70) can be scaled down to a control point at grid position (7, 7), etc. Accordingly, a smaller outline representing the character may be calculated and there is a reduced need for storing a number of different sizes of bit-maps for the character.

The smaller outline can then be analyzed to identify grid locations (e.g., pixels) that are to be turned on and that are to be turned off (a process often referred to as "scan conversion"). One scan conversion algorithm determines if the center of a grid position is inside or outside a resulting scaled down outline. When the center of a grid position is inside the scaled down outline the grid position is turned on. On the other hand, when the center of a grid position is outside the scaled down outline the grid position is turned off.

Unfortunately, at times, and especially at lower resolutions, the results of scan conversion produce an unacceptable representation of a character. Unacceptable character representations can result from rounding errors in the scaling down process or from the scan conversion process itself. Further, rounding errors have a greater affect on character representation when a single grid location (e.g., a pixel) is on scale with the features of a character. For example, a rounding error that causes one grid location to be inappropriately turned on (or turned off) on a 50×50 grid may not even be detectable by the human eye. However, a rounding error that causes one grid location to be inappropriately turned on (or turned off) on a 4×4 grid may result in a character that is perceived as unacceptable to the human eye. Thus, at lower resolutions scan conversion can even fail to preserve the topology of the original outline of the character, for example, causing disconnected grid locations, inappropriately located features, and lack of symmetry.

For example, when an outline is reduced to a small size and is to be rendered with a limited number of pixels, the resulting character may be rendered at a non-optimal location in a grid space. A number of characters in Latin (Greek, Cyrillic, etc.) fonts have a horizontal stroke ("cross-bar") somewhere between the top and the bottom of the character. For example, a capital "H" has a cross-bar approximately halfway between the top and the bottom. FIG. 1 depicts an outline 100 of Times New Roman capital "H". By design, the position of the cross-bar is marginally above the mathematical halfway point of the vertical stroke of the "H". That is, distance 101 is less than distance 102.

However, by the time the "H" is rendered at a smaller size and lower resolution (e.g., 9 pt on a 96 dpi device), accumulated quantization errors can result in the cross-bar being rendered below the mathematical halfway point. Rendering the cross-bar below the half-way points is less than optimal, since the cross-bar was, by design, to be rendered above the halfway point. Pixel pattern 103 represents the pixels that would be turned on to render Times New Roman capital "H" at 9 pt and at 96 dpi resolution (i.e., the results of performing scan conversion on outline 100). As depicted in pixel pattern 103, the cross-bar is below the mathematical halfway point of the vertical stroke of the "H".

One cause of non-optimal rendering results from the "H" having control points on the edges of the cross-bar, but not having control points, for example, on an imaginary line (represented by dashed line 104) along the center between the edges of the cross-bar. Traditional hinting solutions thus add a first constraint to a first control point, for example, on the top edge of the cross-bar (control point 107). The first constraint enforces a proportional position of the first control point in vertical direction relative to other control points on the base line (e.g. control point 109) and the caps line (e.g., control point 106). Subsequently, traditional solutions also add a second constraint to a second control point, for example, on the bottom edge of the cross-bar (control point 108). The second constraint enforces a distance between the second control point on the bottom edge and the previously constrained first control point (control point 107) on the top edge.

Since both the first and second constraints will have to round positions in the vertical direction to the nearest grid position (e.g., pixel), each of the first and second constraints can introduce a rounding error of up to half a pixel, either way (up or down). In unfortunate cases, these rounding errors accumulate (e.g., both the first and second constraints round down)—to place the cross-bar below the mathematical halfway point.

Further, when an outline passes through the center of one or more grid locations, scan conversion of the outline can result in the character being rendered asymmetrically in a grid space. Italic fonts pose a particularly challenging problem because the jagged nature of diagonal strokes makes italic fonts more difficult to process, and quantization errors can compound the problem.

As previously mentioned, scan-converters have to define what is an interior pixel, even in cases where a pixel could just as well be an interior or an exterior pixel (e.g., when an outline passes through the center of the pixel). For example, TrueType® defines that when an outline is through the center of a pixel, the pixel is to be turned on. Thus, if an outline is a straight line, and if the line's run and rise (slope) reduce to a pair of odd numbers, the outline will pass through one or more pixel centers, and TrueType® will turn on a pixel, which may look like an extra pixel.

Referring now to FIG. 2, FIG. 2 depicts an Arial Italic Capital "H". The right edge of the left italic stroke (from control point 211 to control point 214) may rise 5 pixels for every pixel it runs across—a total of 2 pixels over and 10 pixels up, which reduces to a pair of odd numbers 1 and 5—and we can readily observe extra pixels (pixels 231, 232, and 233). Further, even when pixels having their centers exactly on an outline are turned off problems can still occur. For example, in FIG. 2, if pixels whose centers are exactly on the outline were to be turned off (instead of on), there would be two missing pixels (pixels 234 and 236), yielding a discontinuity in the pixel pattern. One approach is to define pixels whose centers are exactly on an outline to alternate between interior and exterior pixels as edges alternate between left and right edges. While this could solve the problem for some italic strokes, such an alternating approach would also introduce new problems on round strokes. For example, such an alternating approach could lead to asymmetrical pixel patterns in characters such as, an "O".

Further, any movement of control points to comply with constraints can cause control points to be moved to inexact locations. Utilizing a control point that is at an inexact location for further calculations can result in non-optimal rendering of a corresponding character in a grid space. Often, hinting control points can include aligning some control points with other control points. For example, still referring to FIG. 2, control points 212 and 213 may have to be aligned with control points 211 and 214 because control points 211 and 214 may have been moved as a result of complying with their own constraints (e.g., constrained to caps and base lines respectively). While the act of aligning is a mathematically exact concept, its implementation in terms of a font hinting language (e.g., TrueType®) likely introduces numerical inaccuracies, because the internal numerical precision of font hint processors is typically limited. For example, the font hinting language TrueType® uses 6 binary places to store fractional control point location data and thus every numerical result can be accurate to only $2^{6th}$ or 1/64 of a pixel. Accordingly, the result of aligning, for example, control point 212 with its parent points 211 and 214 will be accurate to the nearest 1/64 of a pixel only—at best.

More specifically, since the line from control point 214 to control point 211 is 2 pixels over and 10 pixels up (as depicted in pixel pattern 203), it will run 0.2 pixels over for every pixel up. Accordingly, it should be 1.2 pixels over at control point 212, because control point 212 is 6 pixels up, or in terms of 1/64 of a pixel, it should be 1 12.8/64 pixel over. Unfortunately, 12.8/64 is beyond the precision limit of most, if not all, font hint processors. That is, 12.8/64 simply cannot be represented, and has to be rounded one way or the other (e.g., up or down to the nearest 1/64). Hint processors are typically configured with a default rounding behavior, for example, to always truncate, always round down, or always round up. In FIG. 2, and seemingly by chance, control points of the cross-bar are rounded down, even though rounding up would be a better approximation of the actual value (12.8 is closer to 13 than to 12). This error appears to be harmless, because it led neither to a spurious pixel, nor to a missing pixel.

Conversely, for control point 215, which again is over by 1 12.8/64 pixel, rounding down did lead to a spurious pixel (pixel 235), while rounding up would have prevented it. Moreover, the generality of typical font hint processors can produce results that are off by a fraction of a pixel, irrespective of the direction of rounding. Thus, even if rounding were to be correct, alignment problems can still result.

Additionally, character outlines that have too many control points can result in non-optimal rendering of a corresponding character in a grid space. For example, erroneous pixels can potentially arise when the exact shapes of outlines have increased complexity. For example, FIG. 3 depicts a Palatino Italic "H". The Palatino Italic "H" includes significantly more control points than the Arial Italic "H" depicted in FIG. 2. The edges of the strokes of the Palatino Italic "H" are slightly curved, and thus include extra control points to model these curves. As depicted in FIG. 3, these control points are positioned in a seemingly random fashion on outline 300. Applying traditional scan conversion to outline 300 would result in a non-optimal pixel pattern, such as, for example, pixel pattern 303.

Unfortunately, some hint processors refer to control points by consecutive number and removing a control point can cause other control points to be renumbered. Thus, renumbering control points can cause existing hinting instructions to refer to incorrect control point numbers. For example, removing what may be viewed as extraneous control points on outline 300 could cause existing hints to be inappropriately applied to any remaining control points (or not be applied at all). Inappropriate application of hints to remaining control points can significantly degrade a corresponding pixel pattern.

Accordingly, to compensate for the sometimes non-optimal or inappropriate results of scan conversion (e.g., at lower point sizes and lower resolutions), a human typographer programmatically controls the scan conversion process on an ad-hoc basis by manually adding delta-exception hints (e.g., TrueType® instructions) to character outlines. Delta-exception hints are hints which are specific to individual characters and specific to a particular type size. That is, for each type size (of a font) at which there is an unfortunate quantization problem, the human typographer has to add possibly a plurality of delta-exception instructions, as appropriate. Since delta-exception hints are so specific, delta-exception hints are typically stored along with the character the delta-exception hints will be applied to (e.g., in a font file). Moreover, the use of delta-exception hints is an iterative process requiring repeated visual inspection of a plurality of type sizes before and after the application of corresponding exception instructions, which is laborious and prone to introduction of inconsistencies.

Due in part to the wide variety of different artistic and technical features in different fonts, delta-exception hints must also be tailored to an individual font. That is, delta-exception hints for one font typically can not be reused for other fonts (even for the same character). Thus, for each new font, a typographer is required to iteratively and manually determine and apply appropriate delta-exception hints.

Further difficulties can occur for characters that have more than one stroke feature. For example, a "H" has two vertical strokes. If both of these vertical strokes are positioned in accordance with various other techniques, it may be that the positioning of a first stroke will shift the first stroke in one direction (e.g., left), and the positioning of the second stroke will shift the second stroke in the opposite direction (e.g., right). The combined positioning results in accumulated rounding error with respect to character width or stroke-to-stroke distance.

For example, FIG. 12 depicts an outline 1200 of Times New Roman capital "H". By design, distance between edge 1204 and edge 1205 is defined as distance 1208. However, by the time the "H" is rendered at a smaller size and lower resolution (e.g., 9 pt on a 96 dpi device), accumulated quantization errors, can result in non-optimal, or even inappropriate, rendering of the Times New Roman capital "H".

For example, rounding the position of vertical stroke 1201 to the left and rounding the position of vertical stroke 1202 to the right can result in the distance between the vertical strokes (as well as the black body width) being to large. Rendering Times New Roman capital "H" at the depicted width is less than optimal, since the width 1207 was, by design, to be rendered in accordance with distance 1208. Pixel pattern 1203 represents the pixels that would be turned on to render Times New Roman capital "H" at 9 pt and at 96 dpi resolution (i.e., the results of performing scan conversion on outline 1200). As depicted in pixel pattern 1203, the width exceeds width 1207 by more than a pixel.

Although default behavior may be used to cause two strokes to be rounded in the same direction, this can also result in consecutive glyphs becoming indistinguishable due reduced space between the glyphs. For example, one pair of glyphs that may be hard to distinguish without proper spacing is a lower case "c" and a lower case "l". If the lower case "c" and a lower case "l" "touch", the resulting pixel pattern may look like a lower case "d".

BRIEF SUMMARY OF THE INVENTION

The foregoing problems with the prior state of the art are overcome by the principles of the present invention, which are directed to rendering stroke pairs for graphical objects. A computer system accesses an outline representing a graphical object. The graphical object includes at least a first stroke and a second similarly oriented second stroke collectively representing a stroke pair. The computer system calculates the width of the first and second strokes. The computer system calculates the distance between the first stroke and the second stroke.

The computer system constrains the calculated distance between the first stroke and the second stroke. Constraining the calculated distance between the first stroke and the second stroke mitigates the possibility of rounding errors causing the represented stroke pair to be inappropriately rendered. The computer system adjusts the represented stroke pair in accordance with the constrained distance between the first stroke and the second stroke. Adjusting the represented stroke pair includes: 1) adjusting one or more control points of the first stroke relative to a calculated center line for the first stroke to mitigate the possibility of rounding errors causing the first stroke width to be inappropriately rendered and 2) adjusting one or more control points of the second stroke relative to a calculated center line for the second stroke to mitigate the possibility of rounding errors causing the second stroke width to be inappropriately rendered.

The computer system constrains the adjusted stroke pair between external reference points. Accordingly, the graphical object is configured for appropriate rendering relative to other graphical objects. The computer system renders the graphical object, including the adjusted constrained stroke pair, at an output device.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
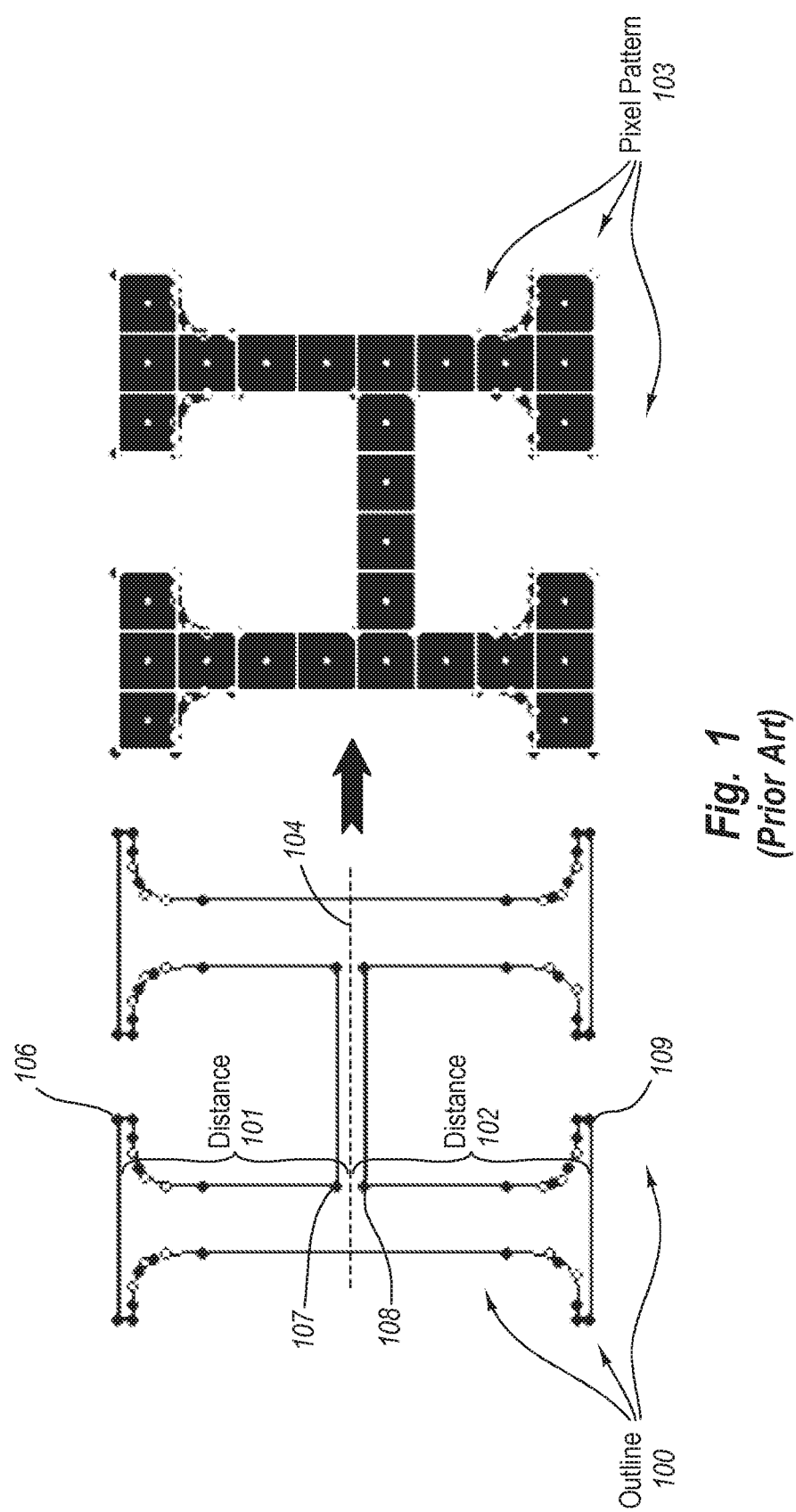
FIG. 1 is a prior art diagram of an outline and a corresponding pixel pattern for a character of text.
Figure 2:
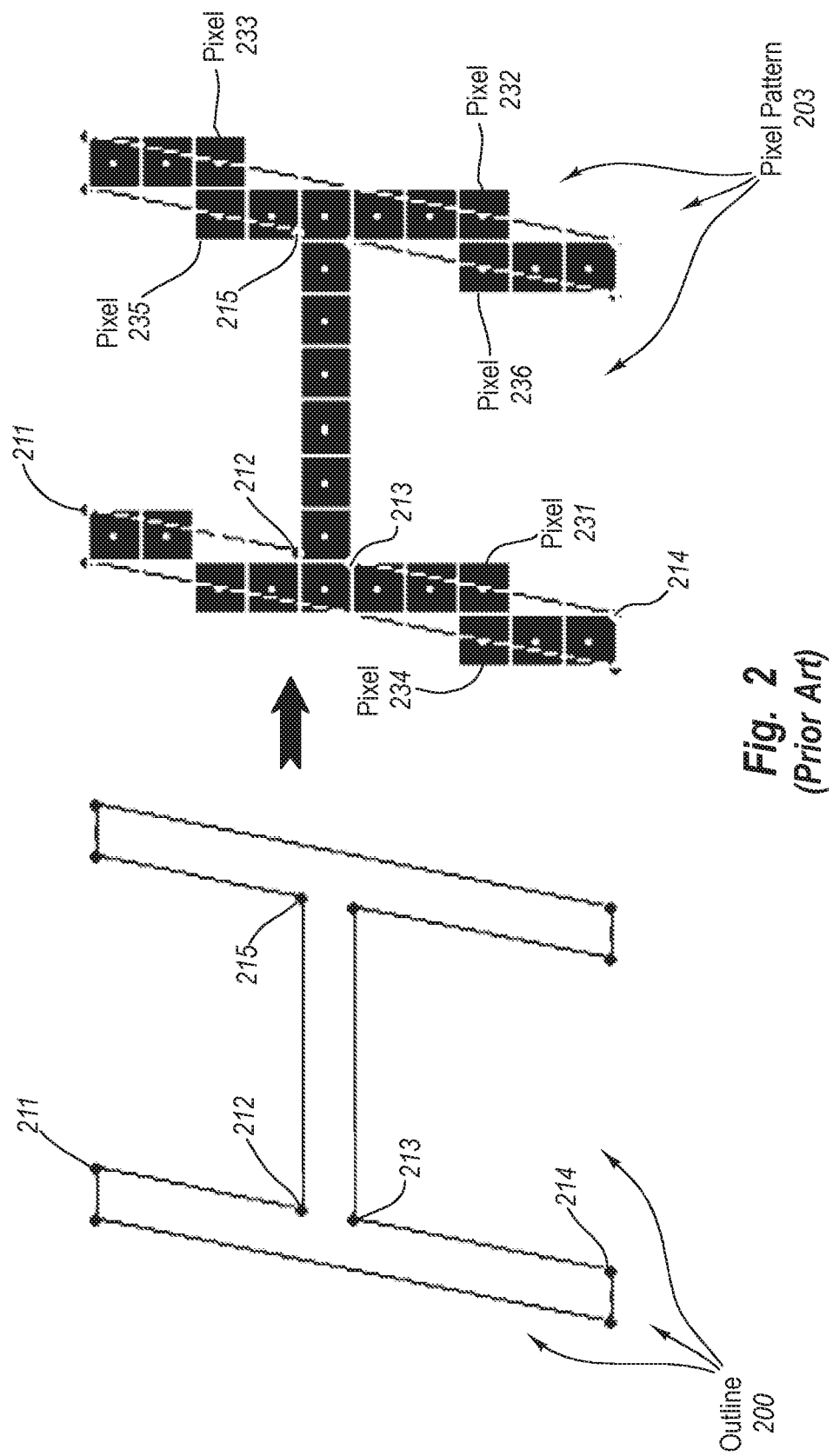
FIG. 2 is a prior art diagram of an outline and a corresponding pixel pattern for a character of text.
Figure 3:
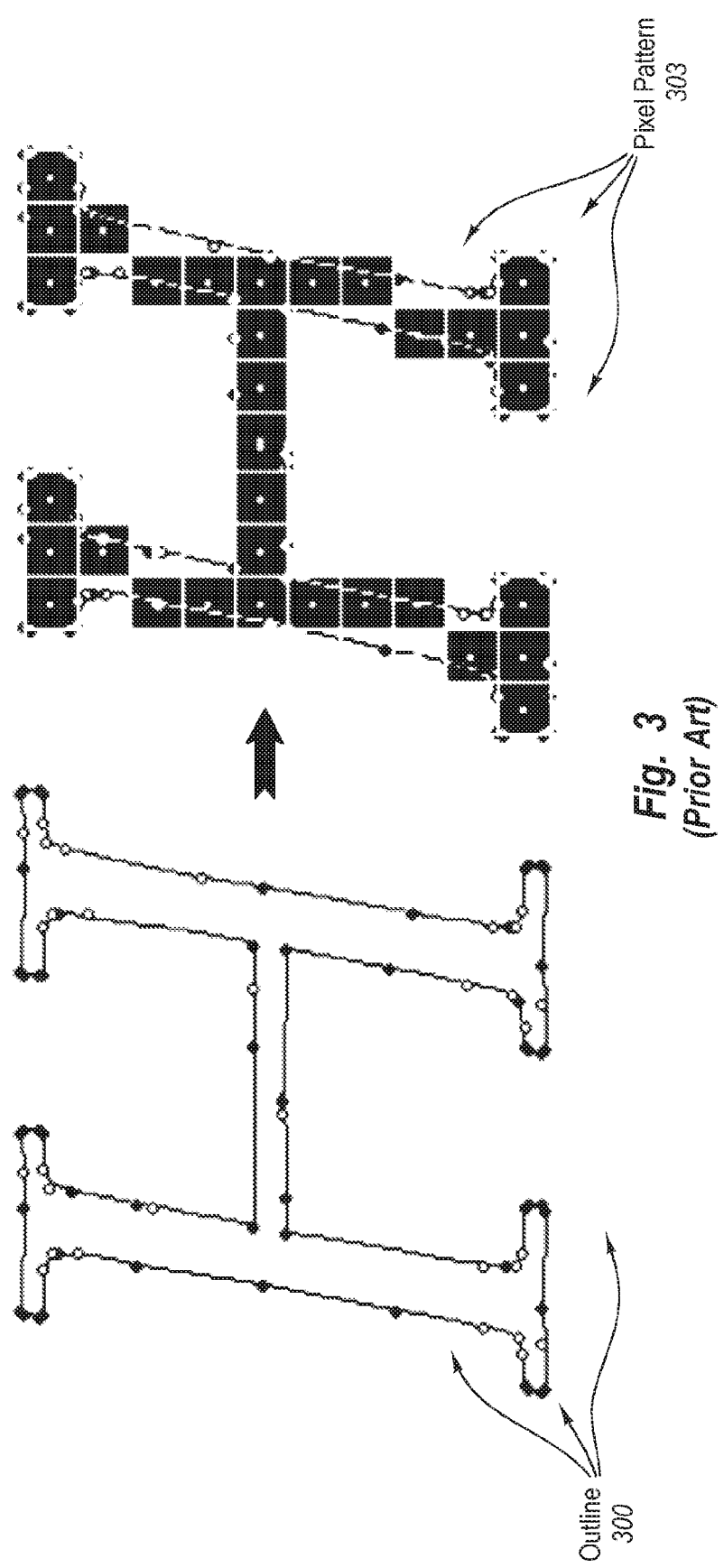
FIG. 3 is a prior art diagram of an outline and a corresponding pixel pattern for a character of text.

The principles of the present invention relate to systems, methods, and computer program products for to rendering stroke pairs for graphical objects. A computer system accesses an outline representing a graphical object. The graphical object includes at least a first stroke and a second similarly oriented second stroke collectively representing a stroke pair. The computer system calculates the width of the first and second strokes. The computer system calculates the distance between the first stroke and the second stroke.

The computer system constrains the calculated distance between the first stroke and the second stroke. Constraining the calculated distance between the first stroke and the second stroke mitigates the possibility of rounding errors causing the represented stroke pair to be inappropriately rendered. The computer system adjusts the represented stroke pair in accordance with the constrained distance between the first stroke and the second stroke. Adjusting the represented stroke pair includes: 1) adjusting one or more control points of the first stroke relative to a calculated center line for the first stroke to mitigate the possibility of rounding errors causing the first stroke width to be inappropriately rendered and 2) adjusting one or more control points of the second stroke relative to a calculated center line for the second stroke width to mitigate the possibility of rounding errors causing the second stroke to be inappropriately rendered.

The computer system constrains the adjusted stroke pair between external reference points. Accordingly, the graphical object is configured for appropriate rendering relative to other graphical objects. The computer system renders the graphical object, including the adjusted constrained stroke pair, at an output device.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media.

Thus, by way of example, and not limitation, computer-readable media can comprise physical storage media or transmission media. Physical storage media can include RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network or data links which can be used to carry or desired program code means in the form of computer-executable instructions or data structures and which can be accessed by a general purpose or special purpose computer. Combinations of the above should also be included within the scope of computer-readable media.

In this description and in the following claims, a "computing system" is defined as one or more software modules, one or more hardware modules, or combinations thereof, that work together to perform operations on electronic data. For example, the definition of computing system includes the hardware components of a personal computer, as well as software modules, such as the operating system of the personal computer. The physical layout of the modules is not important. A computing system may include one or more computers coupled via a network. Likewise, a computing system may include a single physical device (such as a mobile phone or Personal Digital Assistant "PDA") where internal modules (such as a memory and processor) work together to perform operations on electronic data.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Those skilled in the art will appreciate that the invention may be practiced in network computing environments with many types of computing system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 4:
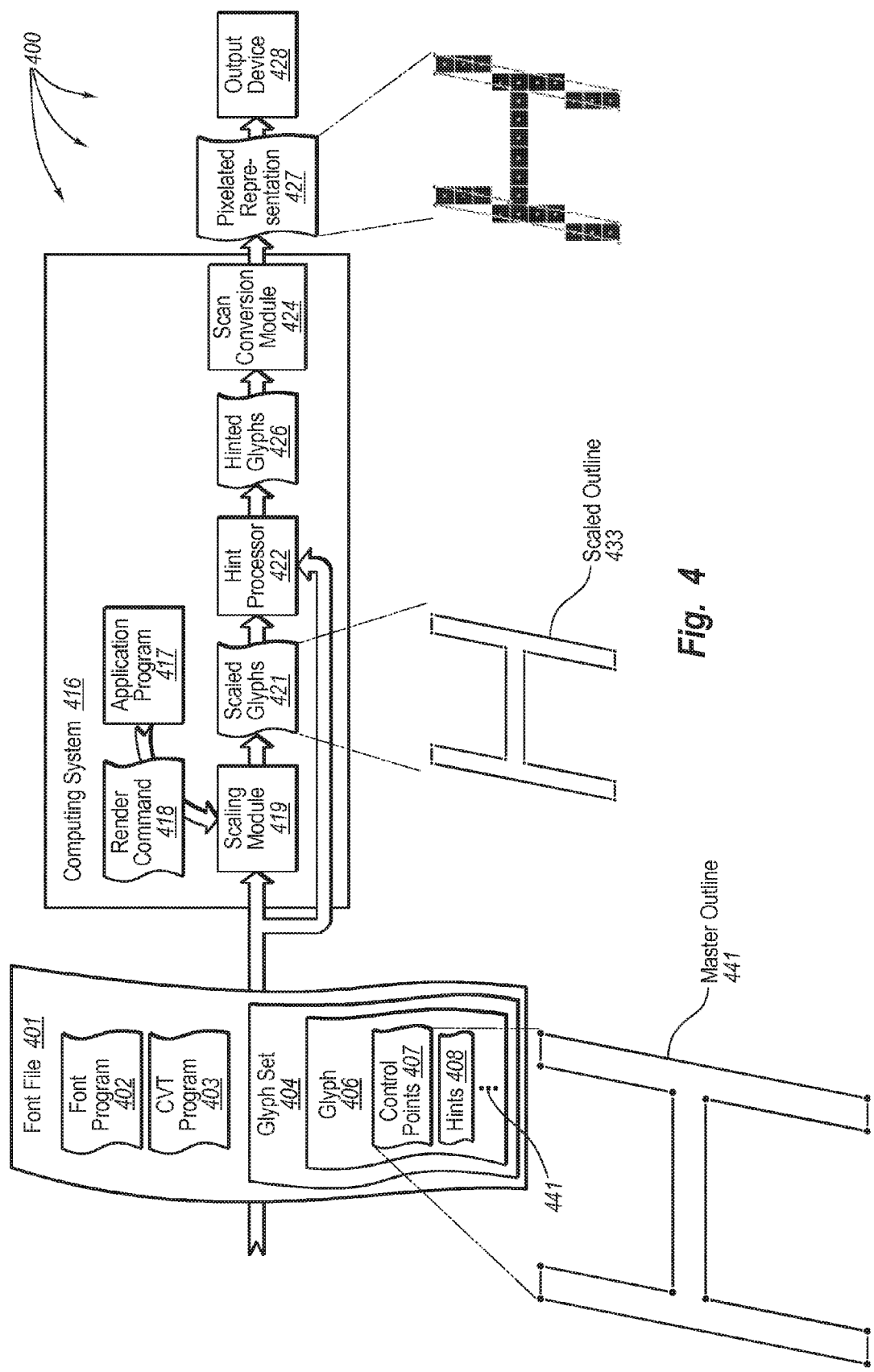
FIG. 4 illustrates a computer architecture for implementing the principles of the present invention.

FIG. 4 illustrates an example of computer architecture 400 for appropriately rendering graphical objects that would otherwise be rendered inappropriately or be rendered in a non-optimal manner. Generally, in response to a command (e.g., render command 418) from an application program (e.g., application program 417), computing system 416 can cause graphical objects, such as, for example, text, to be rendered at output device 428. For example, in response to a selection of the Arial font and 6 point size, a word processor can subsequently render text using the Arial font at 6 point size.

For example, font file 401 (e.g., stored at or network accessible to computing system 416) contains font program 402, CVT program 403, and glyph set 404. Font program 402 includes a set of instructions that can be loaded when font file 401 is accessed (e.g., by application program 417). Font program 402 facilitates the creation of function definitions and instruction definitions that can be called from elsewhere in font file 401 (e.g., from CVT program 403 or hints 408). CVT program 403 includes a set of instructions that are executed when a point size or transformation is changed. CVT program 403 facilitates font wide changes that relieve a font developer from having to manage such changes in individual glyphs. CVT program 403 can be used to establish a table of standardized distances (e.g., stroke weight, distance between glyphs, etc) and reference heights (e.g., capitalization line, subscript line, etc.) applicable to a font at a particular point size and resolution. It may be that CVT program 403 includes instructions that call other instructions and functions defined in font program 402.

Glyph set 404 (e.g., a character set) can contain a plurality of glyphs (e.g., representing characters). While only glyph 406 is expressly depicted, vertical ellipsis 441 represents that other glyphs, in addition to glyph 406, can be included in glyph set 404. Each glyph in glyph set 404 can be associated with corresponding control points and glyph specific hints for appropriately rendering the glyph. For example, control points 407 and hints 408 can be utilized when rendering glyph 406. It may be that glyph specific hints for a particular glyph (e.g., hints 408) include instructions that call other instructions and functions defined in font program 402.

Hints can be computer-executable instructions of a font-hinting language, such as, for example, TrueType®, representing constraints on glyphs (e.g., in glyph set 404). Some constraints can constrain each of the glyphs in glyph set 404. For example, CVT program 403 can include font-hinting language instructions for representing standardized distances and reference heights that constrain each glyph in glyph set 404 (e.g., to the same capitalization line or horizontal distance from other glyphs). Other constraints can be specific to a particular glyph. For example, hints 408 can include font-hinting language instructions for constraining glyph 406 (e.g., constraints on the cross-bar of an "H").

A font file can contain control points for representing glyph outlines (e.g., master outline 441) at a master size (e.g., a larger size). For example, font file 401 may contain control points and hints for glyphs that are to be rendered at 72 point (at a specified resolution). Accordingly, when a font and font size are selected (e.g., as indicated by display command 418), scaling module 419 can access font file 401 and scale down (or scale up) glyph set 404 for rendering at the selected font size (e.g., 72 point at the specified resolution or even at a different resolution). Scaling module 419 can output scaled glyphs 421 containing scaled down glyphs that correspond to glyph set 404. For example, scaled outline 433 corresponds to master outline 441. Scaled glyphs 421 can also include hints 408, which persist after glyph set 404 is scaled down. Based in part on a selected font size, resolution, and possibly other parameters, such as, for example, zooming factor, scaling module 419 can vary the magnitude of the scaling.

To scale down a glyph, the location of corresponding control points can be divided by a scaling factor. For example, to render a glyph one-tenth the size represented in a font file, the coordinates of each control point representing the glyph (at a larger size) can be divided by 10. It may be that control points defining a character for display on a 100×100 grid are to be scaled down for display on a 10×10 grid. Thus, a control point at grid position (50, 30) can be scaled down to a control point at grid position (5, 3), a control point at grid position (70, 70) can be scaled down to a control point at grid position (7, 7), etc. Accordingly, smaller outlines for glyphs can be calculated.

When scaling down for rendering at color display devices, control point locations may be calculated with additional precision. For example, pixels on some color computer monitors can include distinct red, green, and blue sub-components, or "sub-pixels." Sub-pixels can be individually addressed such that a control point can be determined at least down to the precision of a sub-pixel, for example, $\frac{1}{3}^{rd}$ of a pixel. It may also be that varying the intensity of a sub-pixel can cause the sub-pixel to be perceived as thicker or thinner, potentially resulting in a perceived additional increase in precision. Thus, a control point location can be scaled down to the precision of a fraction of a sub-pixel, the fraction corresponding to the number (N) of samples or virtual pixels taken on a sub-pixel. Subsequently, the fractional position within the sub-pixel gives rise to a number of samples (n) being determined as interior to the outline, with n being a number in range 0 through N inclusive. Finally, the ratio n/N is related to the intensity of the addressed sub-pixel.

Hint processor 422 can process hints (instructions of a font-hinting language) to cause a more appropriate rendering of glyphs (e.g., at smaller sizes). Some hints can be included along with scaled glyphs. For example, scaled glyphs 421 can include font-hinting language instructions for hints corresponding to individual glyphs with glyph set 404 (e.g., hints 408) as appropriate. Other hints can be received from a font file. For example, hint processor 422 can receive font program 402 and CVT program 403 from font file 401. Hint processor 422 can process hints and alter scaled glyphs (e.g., moving control points to alter scaled outlines) in accordance with the hints. Hint processor 422 can output hinted glyphs, such as, for example, hinted glyphs 426.

Scan conversion module 424 can receive hinted glyphs (e.g., hinted glyphs 426) and can identify grid locations (e.g., pixels, sub-pixels, or virtual pixels) that are to be turned on and to identify grid locations that are to be turned off (a process which may be referred to as "scan conversion"). Scan conversion module 424 can output a pixelated representation of one or more glyphs (e.g., pixelated representation 427) from font file 401. Output device 428 can receive a pixelated representation (e.g., pixelated representation 427) and render it accordingly. Output device 428 can be a monochrome or color output device, such as, for example, a display or printer.

Figure 6:
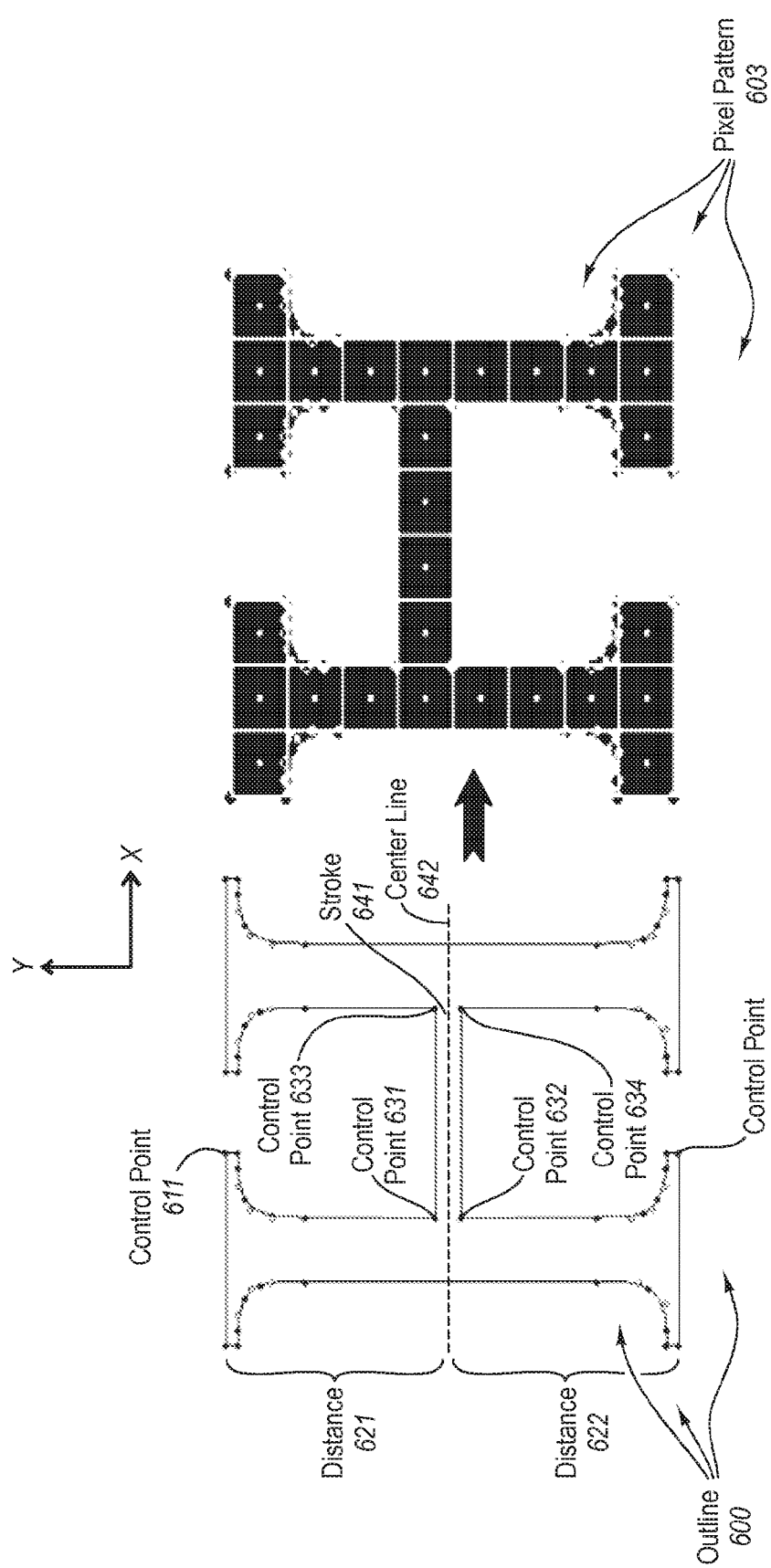
FIG. 6 illustrates an outline and a corresponding pixel pattern resulting from implementing the principles of the presenting invention.

FIG. 6 illustrates an outline 600 and a corresponding pixel pattern 603 resulting from implementing the principles of the presenting invention. Outline 600 represents an outline for a Time New Roman Capital "H". By design, the position of the cross-bar (stroke 641) may be marginally above the mathematical halfway point. That is, distance 621 may be less than distance 622.

Figure 5:
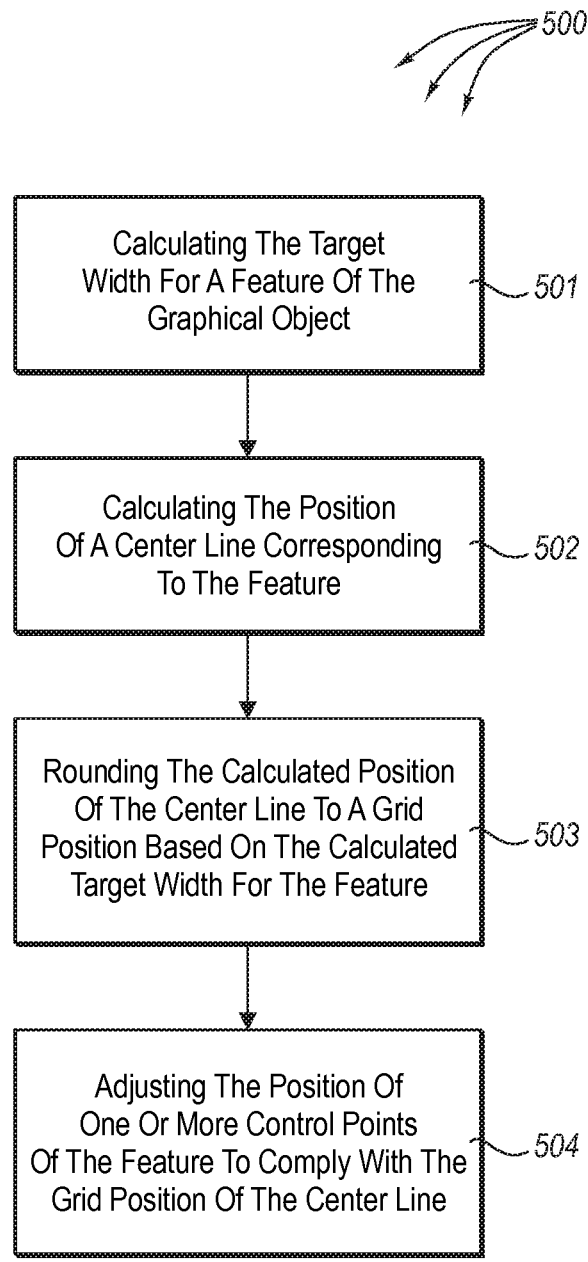
FIG. 5 illustrates an example flowchart of a method for dynamically altering an outline of a graphical object when the outline lacks control points.

FIG. 5 illustrates a flowchart of an example method 500 for dynamically altering an outline of a graphical object when the outline lacks control points. Method 500 will be described with respect to outline 600, pixel pattern 603, and the computing system, modules, and data depicted in computer architecture 400.

Method 500 includes an act of a computing system calculating the target width (or height) for a feature of the graphical object (act 501). For example, hint processor 422 can process instructions loaded from font program 402 to calculate the target width of stroke 641 (e.g., the distance between control point 631 and control point 632). A target width can be one or more grid locations (e.g., one or more pixels). When the size of an outline is so small such that the width of a stroke is less than one grid location, the target width can be rounded up to one grid location. Although, stroke 641 is a horizontal stroke, the target width of vertical and diagonal strokes can also be calculated.

Method 500 includes an act of calculating the position of a center line corresponding to the feature (act 502). For example, hint processor 422 can process instructions loaded from font program 402 to calculate the position of center line 642 (center line 642 being equidistant from control point 631 and control point 632). Although, center line 642 is a horizontal line, the position of vertical and diagonal center lines can also be calculated.

Method 500 includes an act of rounding the calculated position of the center line to a grid position based on the calculated target width for the feature (act 503). For example, hint processor 422 can process instructions loaded from font program 402 to round the calculated position of center line 642 to a grid position based on the target width of stroke 641. To reduce the likelihood of cumulative quantization errors, center line 642 can be rounded to some fraction of a grid position. For example, center line 642 can be rounded to a ½ grid position when the target width of stroke 641 is odd (e.g., an odd number of grid locations). On the other hand, center line 642 can be rounded to a full grid position when the target width of stroke 641 is even (e.g., an even number of grid locations).

Method 500 includes an act of adjusting the position of one or more control points of the feature to comply with the grid position of the center line (act 504). For example, hint processor 422 can process instructions loaded from font program 402 to adjust the positions of control points 631, 632, 633, and 634 to comply with the grid position of center line 642. This increases the likelihood of rendering a pixel pattern that more closely resembles outline 600. For example, this increases the likelihood the cross-bar will be rendered above the mathematical halfway point as depicted by pixel pattern 603.

The following first pseudo-code example represents an algorithm that can be formulated and/or executed to facilitate dynamically altering the outline of a graphical object when the outline lacks control points. The first pseudo-code example can be formulated in a variety of programming languages (e.g., TrueType®) and processed by a corresponding compiler or interpreter (e.g., hint processor 422). Within the first pseudo-code example, text between the symbols "/*" and "*/" represents comments that describe the functionality implemented by the pseudo-code.

```
Line 1:     Input: parent0, child0, child1, parent1, control value
/* determine target stroke weight */
Line 2:     if control value is −1 then
                target stroke weight := the larger of original stroke weight and 1 pixel
Line 3      else
                target stroke weight := the larger of control value and 1 pixel
Line 4:     round target stroke weight to nearest full pixel
/* determine amount by which each stroke edge has to be adjusted to comply */
Line 5:     stroke weight adjust amount := (target stroke weight − original stroke weight)/2
/* determine target center line for stroke */
Line 6:     original stroke center line := (original child0 position + original child1 position)/2
Line 7:     original parent distance := original parent1 position − original parent0 position
Line 8:     target parent distance := target parent1 position − target parent0 position
Line9:      target stroke center line := (original stroke center line − original parent0
position)*(target parent distance)/(original parent distance) + target parent0 position
/* round target center line */
Line 10:    if target stroke weight is odd then
                round target stroke center line to half grid position
Line 11:    else /* is even */
                round target stroke center line to full grid position
/* determine amount by which center line of stroke has to be adjusted to comply */
Line 12:    stroke position adjust amount := target stroke center line − original stroke
center line
/* adjust position of child0 and child1 */
Line 13:    move child0 position by stroke position adjust amount − stroke weight adjust
amount
Line 14:    move child1 position by stroke position adjust amount + stroke weight adjust
amount
```

Within the first pseudo-code example, input values are received at line 1. At line 1, parent0 can refer to control point 612, child0 can refer to control point 632, child1 can refer to control point 631, parent1 can refer to control point 611. Still referencing line 1, control value can refer to an element of a control value table ("CVT") or CVT program, such as, for example, CVT program 403, that represents a standardized distance. Based on the received control value, either line 2 or line 3 is executed to calculate the target stroke weight for a feature (e.g., stroke 641).

At line 2, the original stroke weight refers to the weight of a stroke that has been scaled to a targeted type size and resolution, but that has not yet been modified by hinting instructions. It may be that a hint processor maintains two sets of coordinates for each control point, one set being the original coordinates, the other being the hinted (or instructed) coordinates. Hint instructions can refer to the original or the hinted coordinates, as appropriate. In the first pseudo-code example, maintaining original and hinted coordinates facilitates identification of the original parent distance (the distance between the parents as designed, scaled, but not hinted) and the target parent distance (the distance between the parents as designed, scaled, and hinted). Accordingly, the magnitude of a change in distance as a result of applying hinting instructions can be calculated. In some embodiments, a percentage of this magnitude is used to further calculate the position of the center line.

Referring now to both lines 2 and 3, the target stroke weight, in turn, is determined either by the control value supplied as input parameter (in line 1), or a special parameter −1, indicating that essentially the original stroke weight be taken as target stroke weight. The target stroke weight can be further subject to a minimum distance criterion. If this criterion applies, then the target stroke weight is the larger of the previously determined target stroke weight and 1 pixel (or a different minimum number of pixels).

Line 4 is executed to round the target stoke weight to nearest full pixel. Line 5 is executed to calculate the distance stroke edges are to be moved to comply with the target stroke weight. In some embodiments, edges are moved in a direction perpendicular to the corresponding stroke. For example, each edge of stroke 641 can move some distance in the Y-direction to comply with the target stroke weight for stroke 641. Line 6 is executed to calculate the original stroke center line. In some embodiments, the original stroke center line is calculated from a control point coordinate that quantifies a distance perpendicular to the stroke. For example, the Y-coordinate of control points 631 and 632 can be used to calculate the original stroke center line for stroke 641.

Line 7 is executed to calculate the original parent distance. In some embodiments, similar to calculation of the original stroke center line, the original parent distance is calculated from a control point coordinate that quantifies a distance perpendicular to the stroke. For example, the Y-coordinate of control point 611 can be subtracted from the Y-coordinate of control point 612 to calculate the original parent distance. Line 8 is executed to calculate the target parent distance. The target parent0 and parent1 positions are the positions of parents 0 and 1 as designed, scaled, and hinted.

Line 9 is executed to calculate the target stroke center line. Based on the target stroke weight, either line 10 or 11 is executed to round the target stroke center line. If the stroke weight is odd, the target stroke center line is rounded to half grid position. On the other hand, if the stroke weight is even, the target stroke center line is rounded to full grid position. For example, based on the target stroke weight of stroke 641, center line 642 can be rounded to half (when target stroke weight is odd) or full (when target stroke weight is even) grid.

Line 12 is executed to calculate the stroke position adjustment amount. The stroke position adjustment amount can represent a distance, perpendicular to the direction of stroke, the stroke is to be moved. For example, stroke position adjustment amount for stroke 641 can indicate that stroke 641 is to be moved in the Y-direction. Lines 13 and 14 are executed to adjust child control points to comply with the calculated stroke position. Thus, control points of a feature, such, as for example, controls points 631 and 632, are moved to comply with a corresponding center line that has been rounded to reduce the likelihood of cumulative errors causing the feature to be rendered inappropriately.

Method 500, as well as the algorithm represented in the pseudo-code example, can be used in combination with other constraints (examples of which are described more fully below), to bring control points 633 and 634 into the same position in the Y direction as (i.e., directly horizontal from) control points 631 and 632 respectively.

Figure 7A:
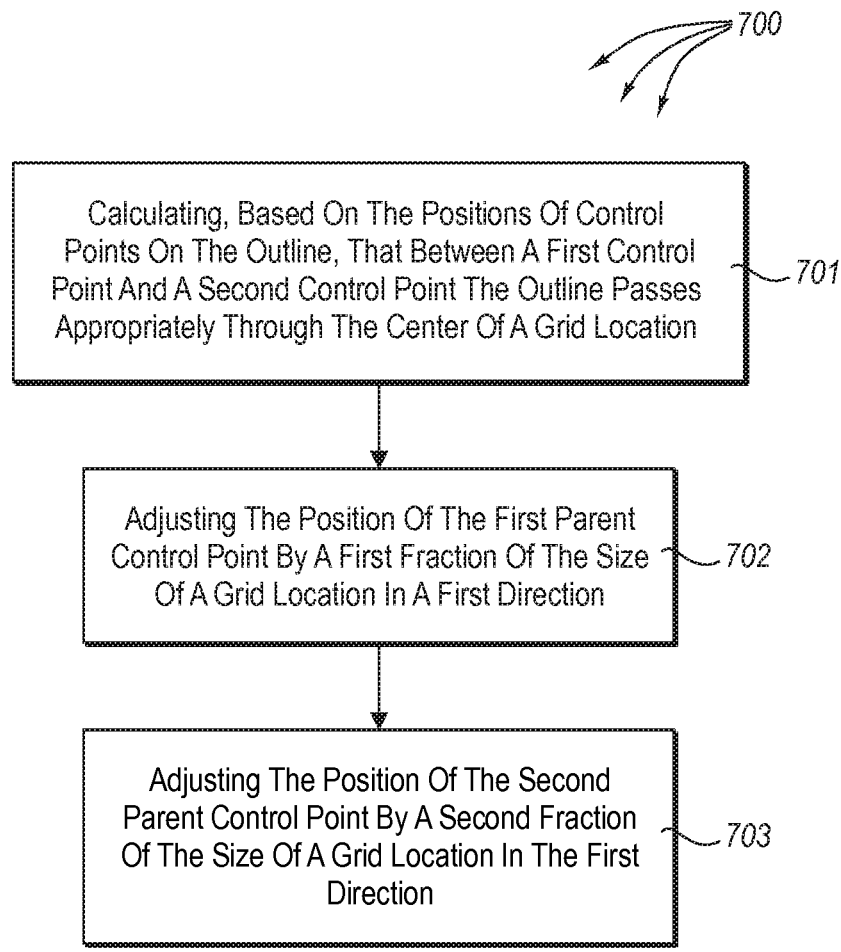
FIG. 7A illustrates an example flowchart of a method for dynamically altering an outline of a graphical object when the outline includes control points approximately on the center of grid locations.
Figure 8:
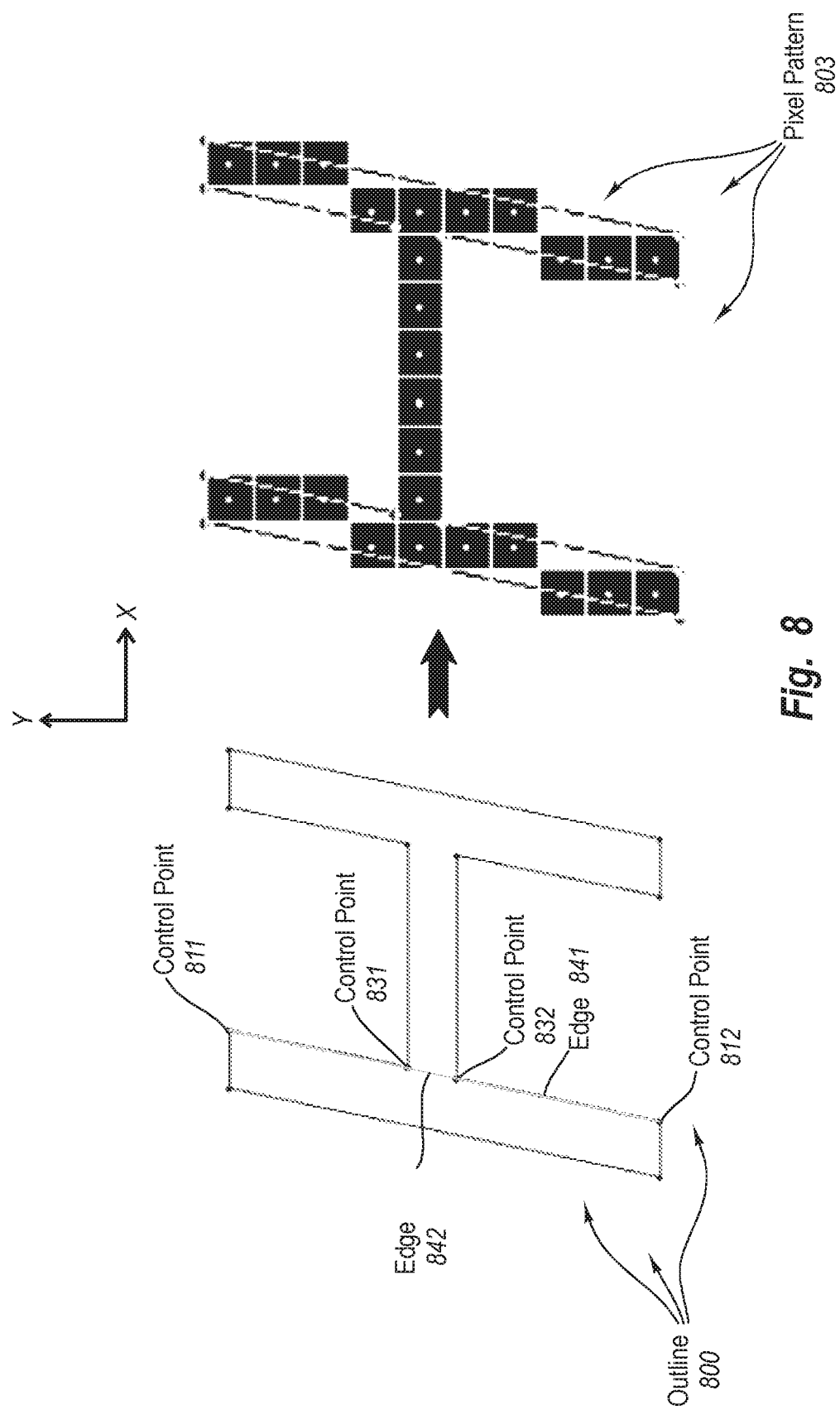
FIG. 8 illustrates an outline and a corresponding pixel pattern resulting from implementing the principles of the presenting invention.

FIG. 8 illustrates an outline 800 and a corresponding pixel pattern 803 resulting from implementing the principles of the presenting invention. Outline 800 represents an outline for an Arial Capital Italic "H". FIG. 7A illustrates a flowchart of an example method 700 for dynamically altering an outline of a graphical object when the outline includes control points approximately on the center of grid locations. Method 700 will be described with respect to outline 800, pixel pattern 803, and the computing system, modules, and data in computer architecture 400.

Method 700 includes an act of calculating, based on the positions of control points on the outline, that between a first control point and a second control point the outline passes approximately through the center of a grid location (act 701). For example, hint processor 422 can process instructions loaded from font program 402 to calculate, based on the positions of control points 811, 812, 831, and 832, that between control point 811 and 812 outline 800 passes approximately through the center of a grid location (e.g., a pixel). Calculating that an outline will pass approximately through the center of a grid location can include determining that the rise and run of a portion of the outline can be reduced to odd numbers. When the rise and run reduce to odd numbers, there is an increased likelihood of the outline passing approximately through the center of a grid location. The position of parent control points can also be used to determine when the parent control points are approximately equidistant from the center of the grid location.

For example, in FIG. 8, edge 842 runs 2 grid locations in the X-direction and rises 10 grid locations in the Y-direction. These run and rise values, 2 and 10, reduce to 1 and 5 (2 is a common multiple of both 2 and 10). Thus, there is an increased likelihood of that outline 800 passes approximately through the center of at least one grid location (due to the slope of edge 842).

Method 700 includes an act of adjusting the position of the first parent control point by a first fraction of the size of a grid location in a first direction (act 703). For example, hint processor 422 can process instructions loaded from font program 402 to adjust the position of control point 811 by a first fraction (e.g., $\frac{1}{64}^{th}$) of the size of a grid location (e.g., pixel) in a first direction. Adjustment of a first parent control point can include moving the first parent control point parallel to an axis of the grid space. For example, control point 811 can be moved $\frac{1}{64}^{th}$ of a pixel in the positive X-direction (or, in FIG. 8, to the right).

Method 700 includes an act of adjusting the position of the second parent control point by a second fraction of the size of a grid location in the first direction (act 703). For example, hint processor 422 can process instructions loaded from font program 402 to adjust the position of control point 812 by a second fraction of the size of a grid location in the first direction. The second fraction may or may not be of the same magnitude as the first fraction. Adjustment of a second parent control point can include moving the second parent control point parallel to an axis of the grid space. For example, control point 812 can be moved $\frac{1}{64}^{th}$ of a pixel in the negative X-direction (or, In FIG. 8, to the left).

In some embodiments, the first and second parent control points are not approximately equidistant from the center of the grid location. Thus, adjusting the position of the first and second parent control points by the same magnitude, for example, in opposite directions, changes the slope (e.g., of edge 842) such that an outline no longer passes approximately through the center of a grid location.

In other embodiments, the first and second parent control points are approximately equidistant from the center of the grid location. Thus, moving the first and second parent control points by the same magnitude, but in opposite directions, causes a corresponding edge (e.g., edge 842) to rotate around the center of the grid location. However, such parent control point movements do not prevent the outline from passing approximately through the center of the grid location. Accordingly, when first and second parent control points are approximately equidistant from the center of a grid location, both the first and second control points can be moved (e.g., $\frac{1}{64}^{th}$ of a pixel) in the same direction. First and second parent control points can be moved by the same or different distances. For example, control points 811 and 812 could both be moved by the same magnitude in the positive X-direction.

Accordingly, there is an increased likelihood of appropriately activating or deactivating a grid location even when an outline passing through the center of a grid location. This increases the likelihood of rendering a pixel pattern that more closely resembles outline 800, such as, for example, pixel pattern 803.

Figure 7B:
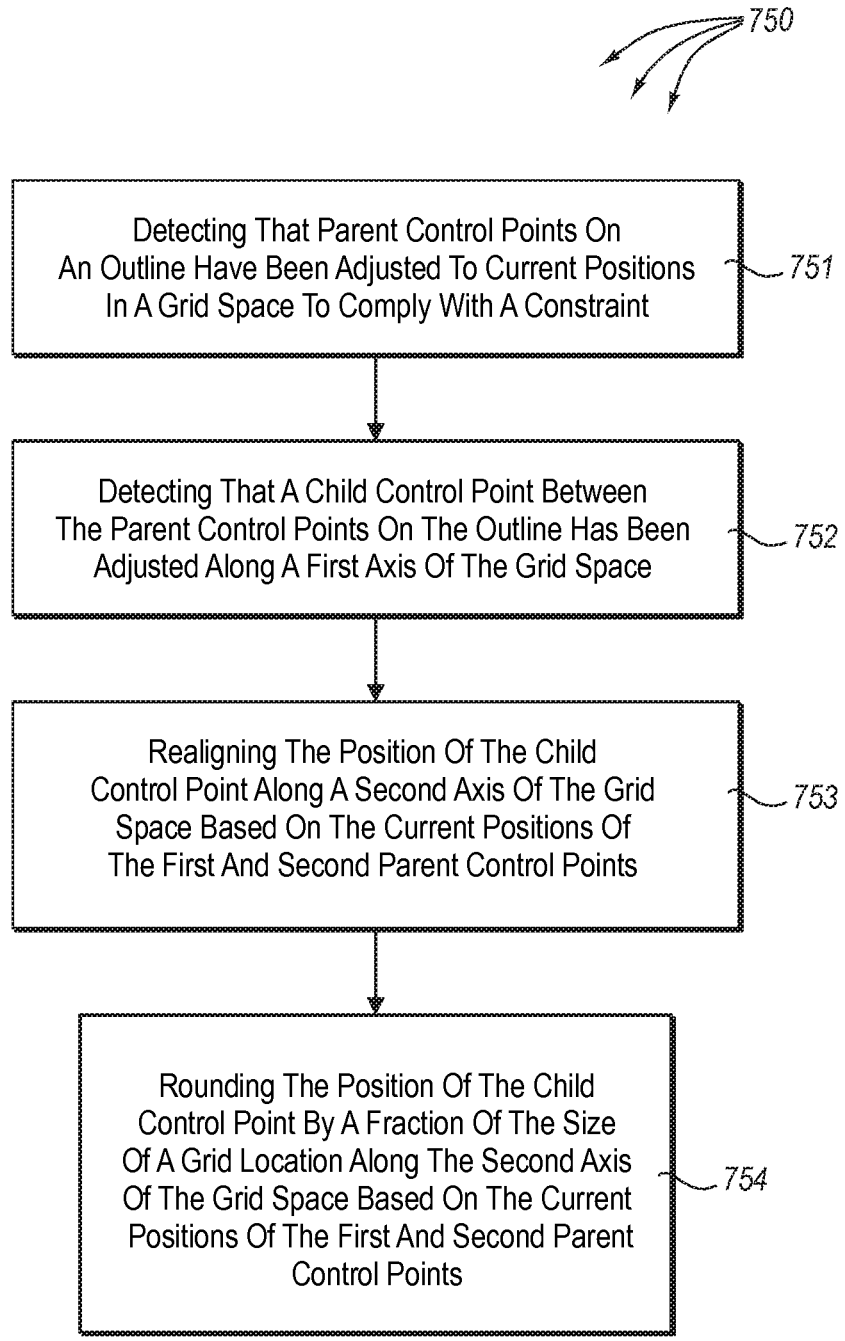
FIG. 7B illustrates an example flowchart of a method for dynamically altering an outline of a graphical object when the outline includes control points at inexact positions.

FIG. 7B illustrates a flowchart of an example method 750 for dynamically altering the outline of a graphical object when an outline has inexact control points. Method 750 will be described with respect to outline 800, pixel pattern 803, and the computing system, modules, and data in computer architecture 400. It may be that moving some control points to prevent an outline from passing approximately through the center of a grid location (e.g., as in method 700) causes other control points to move to inexact positions. That is, a control point may be moved to a location that can not be accurately represented due to the internal precision limit of hint processor 402. However, utilization of method 750 is not limited to those embodiments. It would be apparent to one skilled it the art, after having reviewed this description, that there is a wide variety of different events that can cause control points to be in inexact positions. Method 750 can be utilized to compensate for inexact control point locations irrespective of the cause.

Method 750 includes an act of detecting that parent control points on an outline have been adjusted to current positions in a grid space to comply with a constraint (act 751). For example, hint processor 422 can process instructions loaded from font program 402 to detect that control points 811 and 812 have been adjusted to comply with a constraint. Method 750 includes an act of detecting that a child control point between the parent control points on the outline has been adjusted along a first axis of the grid space (act 752). For example, hint processor 422 can process instructions loaded from font program 402 to detect that the position of control point 831 and/or control point 832 have been adjust in the Y-direction.

It may be, that as a result of hinting, (parent) control points 811 and 812 have been adjusted in both X and Y-direction. Similarly, as a result of applying method 500, (child) control point 832 has been adjusted in Y-direction. Consequently, control point 832 may need adjustment in X-direction, such as to (re-)align control point 832 with parent control points 811 and 812.

Method 750 includes an act of realigning the position of the child control point along a second axis of the grid space based on the current positions of the first and second parent control points (act 753). For example, hint processor 422 can process instructions loaded from font program 402 to realign control point 831 and/or control point 832 in the X-axis based on the current positions of control points 811 and 812. Method 750 includes an act of rounding the position of the child control point by a fraction of the size of a grid location along a second axis of the grid space based on the current positions of the first and second parent control points (act 754). For example, the position of control point 831 and/or control point 832 can be rounded by a fraction (e.g., $\frac{1}{64}^{th}$) of a grid location (e.g., a pixel) in along the X-axis based on the relative position of control point 831 to control point 811.

Calculating the position of a control point may include a division operation (e.g., a calculation including the slope of a line) and thus result in a value that is beyond the internal precision limit of a hint processor. For example, performing a division operation as part of calculating the position of control point 831 can result in a value that is beyond the internal precision of hint processor 422. It may be that the run (i.e., the distance measured parallel to the X-axis) of the line between control points 831 and 811 is (1 and 12.8/64 pixels). However, it may not be possible to accurately represent (12.8/64) when the internal precision of hint processor 422 is 6 bits for the fractional portion of numbers. Accordingly, (12.8/64) is rounded (either down or up) to a value that can be represented with 6 bits of precision.

To reduce, and possible eliminate, rounding errors, a fragment of hinting instructions (e.g., in font program 402) can provide an alternative implementation to hint processor 422's intrinsic operation for calculating the position of a control point. For example, rounding errors can be controlled if the rounding operation itself is folded into the division. If N and D are the integer numerator and the denominator of the math expressed as a single division (N/D), and if the rounding operation is "down," then N/D is the correct result if the intrinsic division operation in the font hint processor rounds down. For example, this would be the correct result in TrueType®, which truncates the fractional part. On the other had, if the rounding operation is "up," then the correct result is (N+D−1)/D. Finally, if the rounding operation were to "round to nearest," then the correct result would be (2*N+D)/(2*D). Thus, it may be that the effective numerators and denominators are integers, and one division is performed to obtain the rounded result. The decision whether to round up or down can be based upon the decisions made in method 700.

The following second pseudo-code example represents an algorithm that can be formulated and/or executed to facilitate dynamically altering the outline of a graphical object when the outline includes control points approximately on the center of grid locations and includes control points at inexact positions. The second pseudo-code example can be formulated in a variety of programming languages (e.g., TrueType®) and processed by a corresponding compiler or interpreter (e.g., hint processor 422). Within the second pseudo-code example, text between the symbols "/*" and "*/" represents comments that describe the functionality implemented by the pseudo-code.

---

Line 21: Input: parent0, parent1
Line 22: Input: parent0, child0, parent1
Line 23: Input: parent0, child0, child1, parent1
Line 24: Input: parent0, child0, child1, ... , childn−1, parent1
/* determine italic run and rise, which at this stage in the process will be full numbers of

```
pixels */
Line 25: italic run := parent1 x-position – parent0 x-position
Line 26: italic rise := parent1 y-position – parent0 y-position
/* reduce ratio of italic run/italic rise by greatest common power of two */
Line 27: reduced italic run := italic run
Line 28: reduced italic rise := italic rise
Line 29: while both reduced italic run and reduced italic are even
Line 30:    reduced italic run := reduced italic run / 2
Line 31:    reduced italic rise := reduced italic rise / 2
Line 32: endwhile
Line 33: if both reduced italic run and reduced italic rise are odd
/* at this point the edge from parent0 to parent 1 runs exactly through at least one pixel
center, hence parent positions are to be altered to avoid this problem. For example,
parent1 can be moved to the right by the smallest fraction possible based on the internal
precision of a hint processor (e.g., 1/64 of a pixel). Likewise, parent0 can be moved to
the left by that same amount. When the (non-reduced) italic run is odd and the (non-
reduced) italic rise is odd a corresponding edge will run through the center of a pixel
which is halfway between the parents. Thus, moving the parents in opposite directions
would rotate the edge about said exact pixel center halfway between the parents, but
would still result in the corresponding edge running through the center of the pixel.
Accordingly, we arbitrarily chose to move both parents in the same direction. */
Line 34:    if italic run is odd move parent1 by 1/64 of a pixel to the left
Line 34:    else move parent1 by 1/64 of a pixel to the right
Line 35: move parent0 by 1/64 of a pixel to the left
Line 36: endif
/* adjust 0 or more children */
Line 37: for each child
          /* calculate target x-position */
Line 38:    relative child y-position := child y-position – parent0 y-position
Line 39:    target x-position := (relative child y-position)*(italic run)/(italic rise)
Line 40:    if (relative child y-position) less than or equal (italic rise)/2 round target
x-position down to the nearest 1/64 of a pixel
Line 41:    else round target x-position up to the nearest 1/64 of a pixel
/* The calculation of the target x-position and the rounding down or up to the nearest
1/64 of a pixel can be combined into a single calculation */
Line 42:    adjust amount := target x-position – actual child x-position
Line 43:    move child by adjust amount
Line 44: endfor
```

Within the second pseudo-code example, lines 21-24 represent the different types of input that can be received. Generally, the second pseudo-code example receives two parent control points and 0 to N child control points. Lines 25 and 26 are executed to calculate the italic run and italic rise respectively. For example, hint processor 422 can calculate the italic run and italic rise of edge 842 based on the position of control points 811 and 812.

Lines 27-32 are executed to reduce the calculated italic run and calculated italic rise by the greatest common power of two. For example, lines 27-32 can be executed to reduce a calculated italic run of 24 and a calculated italic rise of 52 to a reduced italic run of 6 and a reduced italic rise of 13 (i.e., two iterations). Although 6 is divisible by 2, 13 is not and the loop would terminate due to the condition at line 29 being FALSE.

Lines 33-36 are executed when the reduced italic run and the reduced italic rise are both odd. For example, if lines 27-32 calculate a reduced italic run of 3 and a reduced italic rise of 13 (e.g., from an italic run of 12 and italic rise of 52) lines 33-36 can be executed. Execution of lines 33-36 facilitates appropriate adjustment of parent control points such that a corresponding edge does not run through the center of a grid location (e.g., a pixel). For example, control points 811 and 812 can be moved such that edge 842 does not run through the center of a grid location.

Lines 37-44 are executed to adjust any child control points to conform with the adjustments to corresponding parent control points. For each child control point received as input, lines 38-43 can be executed. For example, lines 37-44 can be executed to adjust control points 831 and 832 (child control points) to conform with the adjustments to control points 811 and 812 (parent control points). Line 38 is executed to calculate the position of a child control point relative to a parent control point in a direction perpendicular to the direction the parent control point was adjusted. For example, if control point 811 was previously adjusted, the position of control point 831 relative to control 811 can be (re-)aligned.

Line 39 is executed to calculate a target position for the child control point in the direction the parent control point was adjusted. For example, line 39 can be executed to calculate a target position for control point 831 in the X-direction. Line 40 or line 41 is executed to round the target position in the direction the parent control point was moved. Based on the magnitude of the relative position of the child control point compared to one-half the italic rise, the target position for the child control point is rounded up or down. For example, line 40 or line 41 can be executed to round the target position for control point 831 in the X-direction, based on the magnitude of the relative position of control point 831 in the Y-direction and the italic rise of edge 842. When the magnitude of the relative position is less than or equal to one-half the italic rise, the target position is rounded down. On the other hand, when the magnitude of the relative position is grater than one-half the italic rise, the target position is rounded up. Lines 42 and 43 are executed to appropriately adjust the position of the child control point.

Thus, an outline of a graphical object can be adjusted such that the outline does not run through the center of a grid location and child control points conform with adjustments to the parent control points that result from avoiding grid location centers. Accordingly, the features of the graphical object are preserved and potential sources of rendering errors are eliminated.

Figure 9:
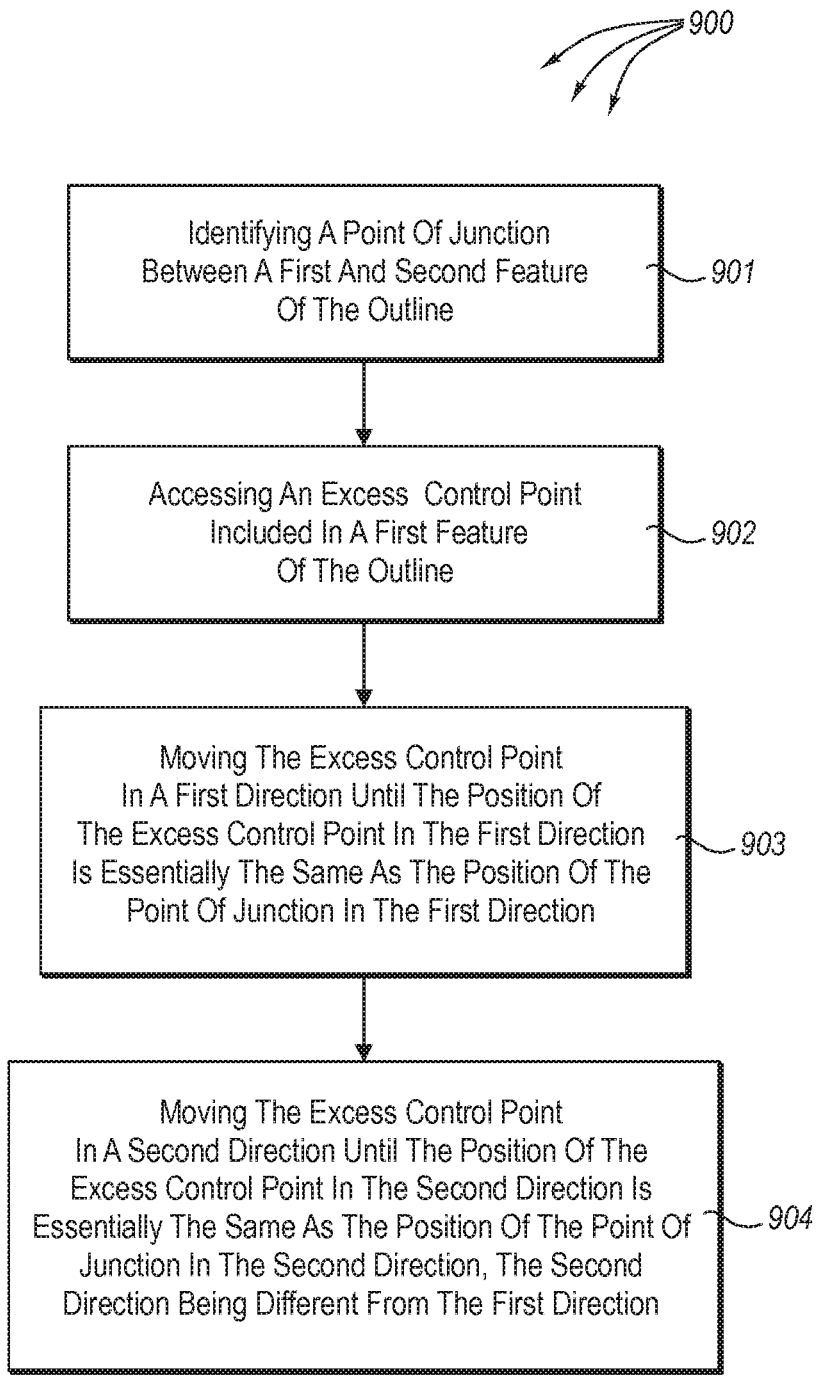
FIG. 9 illustrates an example flowchart of a method for dynamically altering an outline of a graphical object when the outline includes excessive control points.
Figure 10:
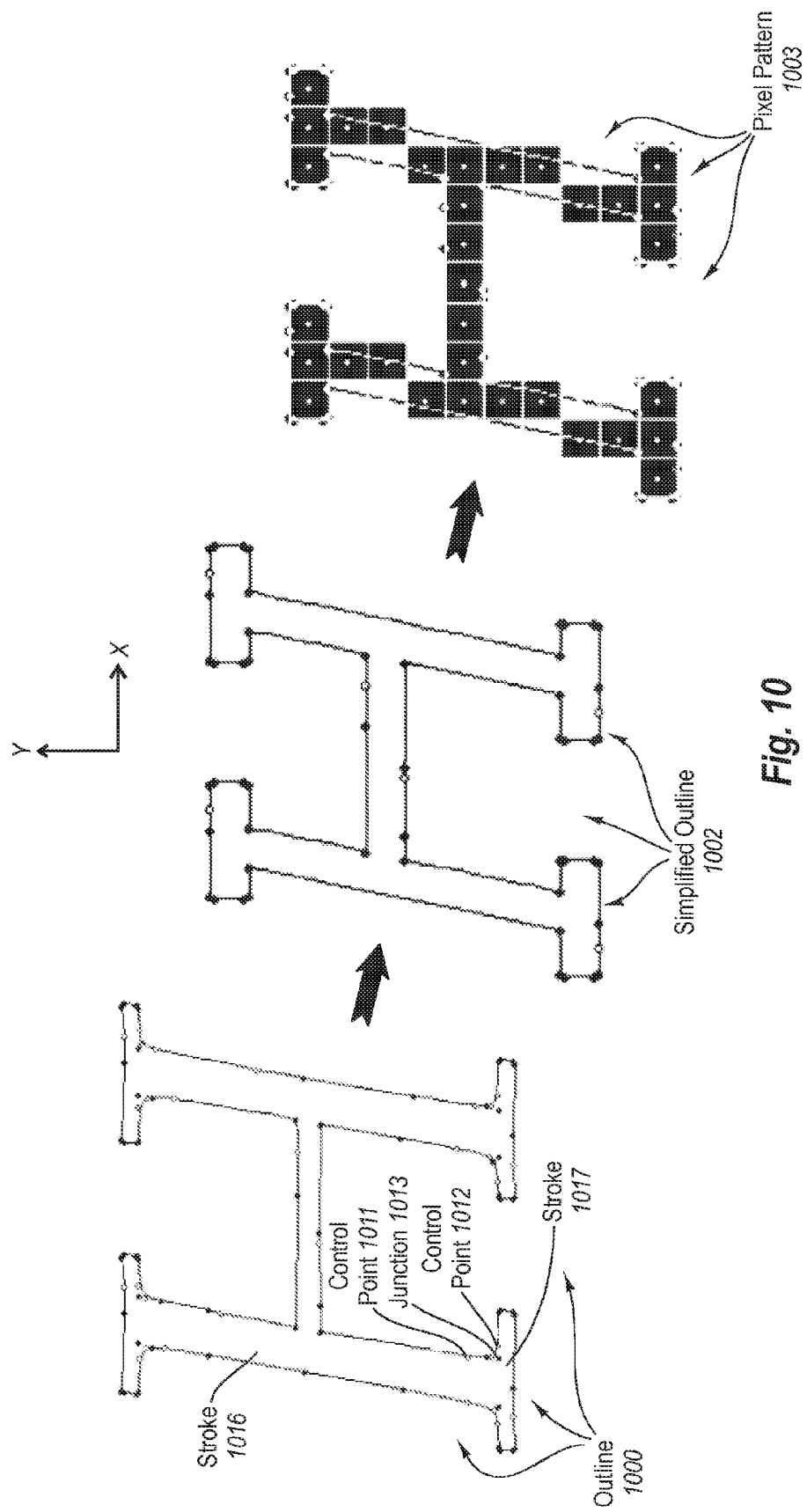
FIG. 10 illustrates an outline, a corresponding simplified outline, and a corresponding pixel pattern resulting from implementing the principles of the presenting invention.

FIG. 10 illustrates an outline 1000, a simplified outline 1002, and a corresponding pixel pattern 1003 resulting from implementing the principles of the present invention. Outline 1000 represents an outline for a Palatino Capital Italic "H". FIG. 9 illustrates a flowchart of an example method 900 for dynamically altering an outline of a graphical object when the outline includes excess control points. Method 900 will be described with respect to outline 1000, simplified outline 1002, pixel pattern 1003, and the computing system, modules, and data in computer architecture 400.

Method 900 includes an act of identifying a point of junction between a first and second feature of the outline (act 901). For example, hint processor 422 can process instructions loaded from font program 402 to identify that junction 1013 is a point of junction between stroke 1016 and stroke 1017. Points of junction can be identified by extrapolating the edges of outline 100. For example, the edges of strokes 1016 can be extrapolated to intersect an imaginary italic line along each edge of stroke 1016 with an imaginary horizontal line that runs through the top of stroke 1017 (a serif). Junction 1013 depicts an intersection of these two imaginary lines. Other similar extrapolations can be performed for junctions of other features.

Method 900 includes an act of accessing an excess control point included in a first feature of the outline (act 902). For example, hint processor 422 can process instructions loaded from font program 402 to access control point 1011 or control point 1012. Based on a selected point size and resolution, control points 1011 and 1012 can be control points that, if removed from outline 1000, would not significantly alter how the Palatino Capital "H" is rendered. For example, at smaller point sizes and lower resolutions, it may be difficult, if not impossible, to accurately render features resulting from minor variations in outline 1000.

Method 900 includes an act of moving the excess control point in a first direction until the position of the excess control point in the first direction is essentially the same as the position of the point of junction in the first direction (act 903). For example, hint processor 422 can process instructions loaded from font program 402 to move control point 1011 so that control point 1011 aligns with junction 1013 in the X-direction. Similarly, hint processor 422 can process instructions loaded from font program 402 to move control point 1012 so that control point 1012 aligns with junction 1013 in the Y-direction Method 900 includes an act of moving the excess control point in a second direction until the position of the excess control point in the second direction is essentially the same as the position of the point of junction in the second direction, the second direction being different from the first direction (act 904). For example, hint processor 422 can process instructions loaded from font program 402 to move control point 1011 in the Y-direction until the location of control point 1011 is essentially the same as the location of junction 1013. Similarly, hint processor 422 can process instructions loaded from font program 402 to move control point 1012 in the X-direction until the location of control point 1012 is essentially the same as the location of junction 1013.

Corresponding points of junctions between other features of outline 1000 can be similarly identified. Additional excess control points on outline 1000 can be accessed. These additional excess control points can be moved to the corresponding points of junction. Moving excess control points separately in the X-direction and Y-direction, as opposed to a single diagonal movement, reduces rounding errors, which a diagonal movement may introduce. Moving excess control points on outline 1000 to corresponding points of junction can result in simplified outline 1002. Accordingly, the overall shape of the represented character (an "H") is preserved and potential sources of rendering errors are eliminated. This increases the likelihood of rendering a pixel pattern that more closely resembles outline 1000, such as, for example, pixel pattern 1003.

The following third pseudo-code example represents an algorithm that can be formulated and/or executed to facilitate dynamically altering the outline of a graphical object when the outline includes excess control points. The third pseudo-code example can be formulated in a variety of programming languages (e.g., TrueType®) and processed by a corresponding compiler or interpreter (e.g., hint processor 422). Within the third pseudo-code example, text between the symbols "/*" and "*/" represents comments that describe the functionality implemented by the pseudo-code.

```
Line 51:  Input: target, first, last
Line 52: for each control point from first to last
Line 53:     move point in x until its x-position is the same as
             target's x-position
Line 54:     move point in y until its y-position is the same as
             target's y-position
Line 55: endfor
```

Within the third pseudo-code example, input values are received at line 51. Execution of line 51 can include receive a list of excessive control points a point of junction the excess control points are to be moved to. Lines 53 and 54 can be executed for each control points in the lines of excessive control points. Each control point is subject to two separate movements, a first in the X-direction and second movement in the Y-direction. This reduces the likelihood of rounding errors associated with diagonal movements.

Fragments of hinting instructions implementing each of the above describe embodiments can be included in a font-program (e.g., font program 402). This is advantageous since the instructions can be executed to systematically optimize a pixel pattern. Further, the number of hinting instructions is relatively constant (i.e., it doesn't depend on the number of type sizes at which the pixilation is non-optimal), and optimization doesn't require visual inspection at all type sizes. Accordingly, embodiments of the present invention can be included in automatic hinting mechanisms that reduce, potentially significantly, the resources expended to hint fonts.

Figure 14:
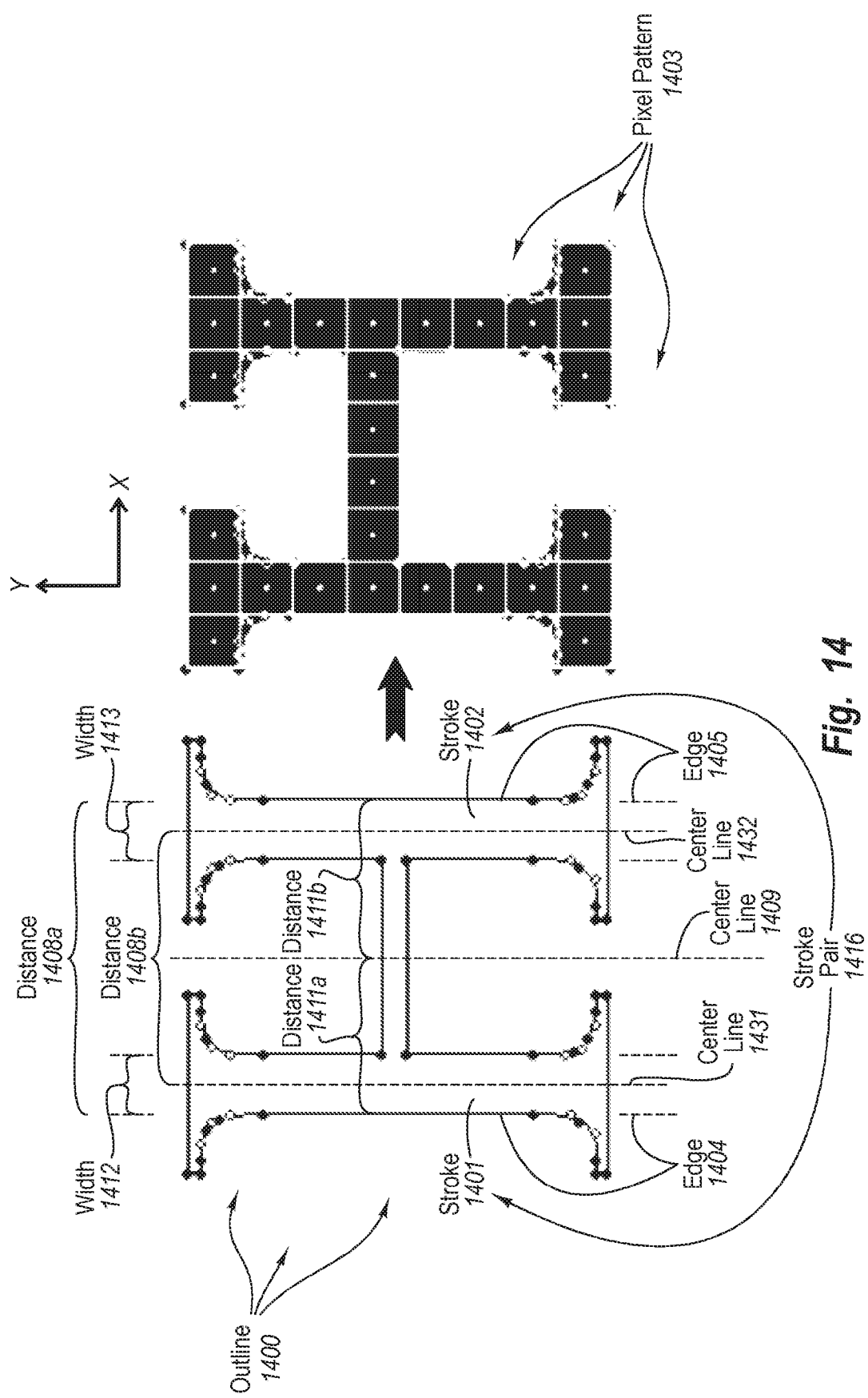
FIG. 14 illustrates an outline and a corresponding pixel pattern resulting from implementing the principles of the presenting invention.

Transitioning now to description related to stroke pairs, FIG. 14 illustrates an outline 1400 and a corresponding pixel pattern 1403 resulting from implementing the principles of the presenting invention. Outline 1400 represents an outline for a Time New Roman Capital "H". By design, the rendering of "H" is to be constrained in accordance with distance 1408a (the blackbody width).

Figure 13:
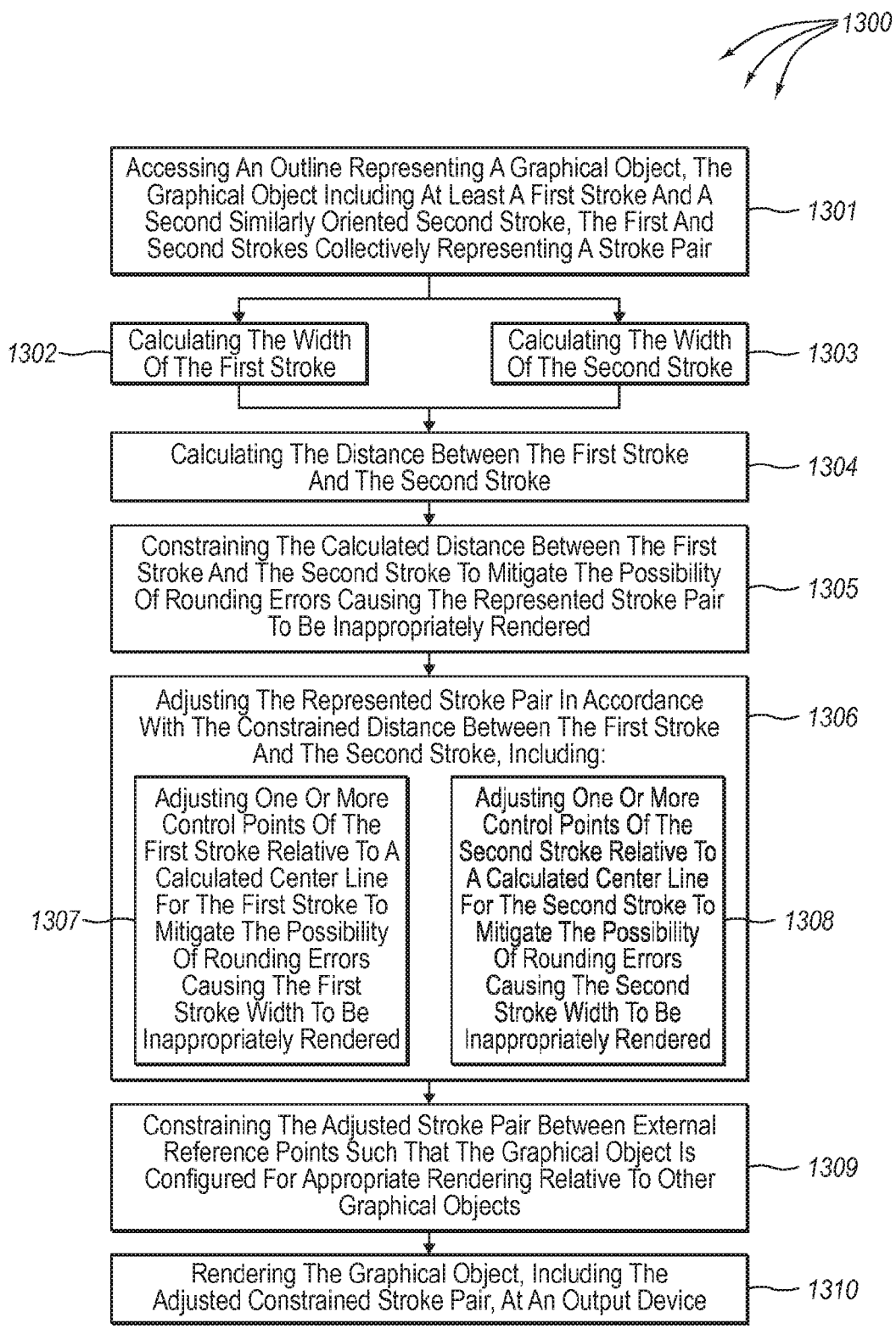
FIG. 13 illustrates an example flowchart of a method for rendering a stroke pair.

FIG. 13 illustrates a flowchart of an example method 1300 for rendering a stroke pair. Method 1300 will be described with respect to outline 1400, pixel pattern 1403, and the computing system, modules, and data depicted in computer architecture 400.

Method 1300 includes an act of accessing an outline representing a graphical object, the graphical object including at least a first stroke and a second similarly oriented second stroke, the first and second strokes collectively representing a stroke pair (act 1301). For example, computing system 416 can access outline 1400 of a capital "H" from glyph set 404. As depicted, the capital "H" includes stroke 1401 and similarly oriented stroke 1402 (both oriented vertically). Collectively, stroke 1401 and stroke 1402 represent stroke pair 1416.

Method 1300 includes an act of calculating the width of the first stroke (act 1302) and an act of calculating the width of the second stroke (act 1303). For example, hint processor 422 can process instructions loaded from font program 402 to calculate width 1412 and 1413. Method 1300 includes an act of calculating the distance between the first stroke and the second stroke (act 1304). For example, hint processor 422 can process instructions loaded from font program 402 to calculate distance 1408*a* between edge 1404 and edge 1405 (i.e., the outer edges of the strokes).

Method 1300 includes an act of constraining the calculated distance between the first stroke and the second stroke to mitigate the possibility of rounding errors causing the represented stroke pair to be inappropriately rendered (act 1305). For example, hint processor 422 can process instructions loaded from font program 402 to constrain the distance 1408*a* between strokes 1401 and 1402. In some embodiments, the location of a center line between the strokes can be determined. For example, hint processor 422 can process instructions loaded from font program 402 to determine the location of center line 1409.

Each of the strokes can then be individually constrained to be a specified distance from the determined center line. For example, hint processor 422 can process instructions loaded from font program 402 to constrain edge 1404 to being distance 1411*a* in the negative X direction from center line 1409. Likewise, hint processor 422 can process instructions loaded from font program 402 to constrain edge 1405 to being distance 1411*b* in the positive X direction from center line 1409. Individual constraint distances for strokes of a stroke pair can be similarly calculated whether stroke widths are the same or stroke widths differ. However, the center line of the blackbody width of a glyph may not be equidistant from inner edges of a stroke, such as, for example, when stroke widths differ.

Method 1300 includes an act of adjusting the represented stroke pair in accordance with the constrained distance between the first stroke and the second stroke (act 1306). For example, when rendering stroke pair 1416, outer edges 1404 and 1405 are first constrained in accordance with distances 1411*a* and 1411*b* from center line 1409. After the outer edges 1404 and 1405 are constrained, other previously described techniques can be utilized to appropriately render the individual strokes 1401 and 1402 of stroke pair 1416.

Alternately, instead of using edges 1404 and 1405, center lines 1431 and 1432 can be calculated. Center lines 1431 and 1432 can then be viewed as edges relative to center line 1409. Method 500 (and/or the algorithm represented in the corresponding pseudo-code example) can then be applied using center lines 1431 and 1432 as edges of a vertical bar and center line 1409 as the center line of the vertical bar to constrain center lines 1431 and 1432 relative to center line 1409. In this embodiment, distance 1408*b* is the constrained distance between the center lines 1431 and 1432 (and is not the blackbody width).

Accordingly, the act of adjusting the represented stroke pair in accordance with the constrained distance between the first stroke and the second stroke, can include an act of adjusting one or more control points of the first stroke relative to a calculated center line for the first stroke to mitigate the possibility of rounding errors causing the first stroke width to be inappropriately rendered (act 1307). For example, hint processor 422 can process instructions loaded from font program 402 to adjust control points of stroke 1401 relative to a center line for stroke 1401.

Likewise, the act of adjusting the represented stroke pair in accordance with the constrained distance between the first stroke and the second stroke, can include an act of adjusting one or more control points of the second stroke relative to a calculated center line for the second stroke width to mitigate the possibility of rounding errors causing the second stroke to be inappropriately rendered (act 1308). For example, hint processor 422 can process instructions loaded from font program 402 to adjust control points of stroke 1402 relative to a center line for stroke 1402.

Adjusting one or more control points of the second stroke relative to a calculated center can be performed in accordance with previously described method 500 and/or the previously described first pseudo-code example.

Thus, in some embodiments, a center line is determined for a stroke pair of a glyph, which may also be (e.g., for glyphs with two similarly oriented strokes, such as, for example, a capital "H" or lower case "n") the center line for the blackbody width of the glyph. However, embodiments of the invention are also applicable to glyphs having multiple stroke pairs to improve rendering of a glyph. For example, a center line between the left and center stroke of a lower case "m" can be determined to improve rendering of the glyph at least for those two strokes.

Method 1300 includes an act of constraining the adjusted stroke pair between external reference points such that the graphical object is configured for appropriate rendering relative to other graphical objects (act 1309). For example, hint processor 422 can process instructions loaded from font program 402 to constrain stroke pair 1416 to one or more of a capitalization line, a base line, and side bearing points used to insure proper distancing between graphical objects that are rendered side-by-side.

In some embodiments, center line 1409 is appropriately positioned, followed by appropriately positioning edges 1404 and 1405 (or center lines 1431 and 1432), between a pair of external reference points (e.g. side-bearing points) similar to method 500. Subsequently, the actual outer (1404 and 1405) and inner (not labeled) edges are positioned relative to the respective center lines 1431 and 1432. This permits strokes 1401 and 1402 to have different widths, such as in a Times New Roman Capital Letter "U", while neither accumulating the positioning error of said strokes towards "the inside" nor "the outside" of the respective character.

Method 1300 includes act of rendering the graphical object, including the adjusted constrained stroke pair, at an output device (act 1310). For example, scan conversion module 424 can render pixel pattern 1403, including adjust stroke pair 1416, at output device 428.

Figure 11:
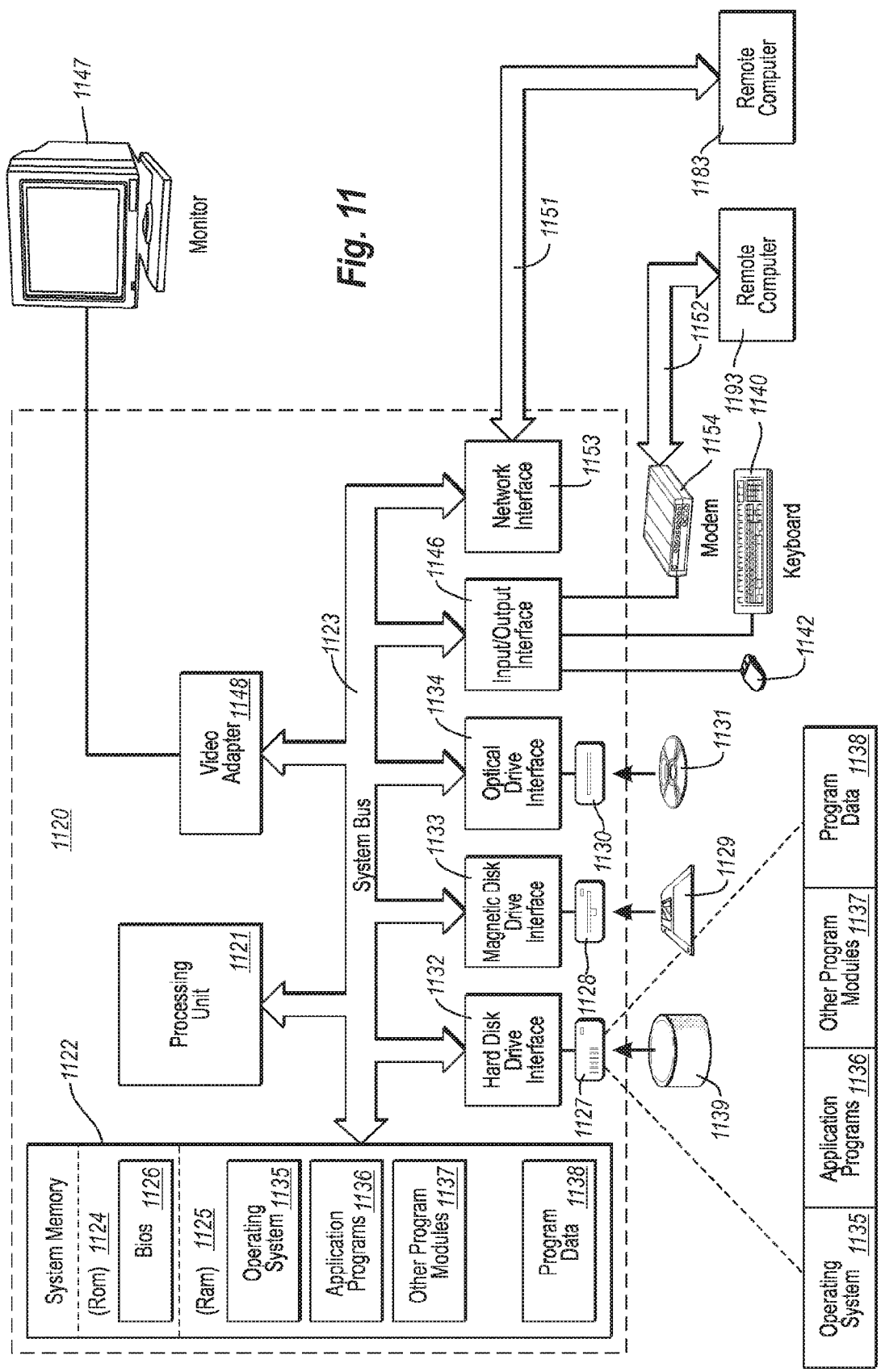
FIG. 11 illustrates a suitable operating environment for implementing the principles of the present invention.
Figure 12:
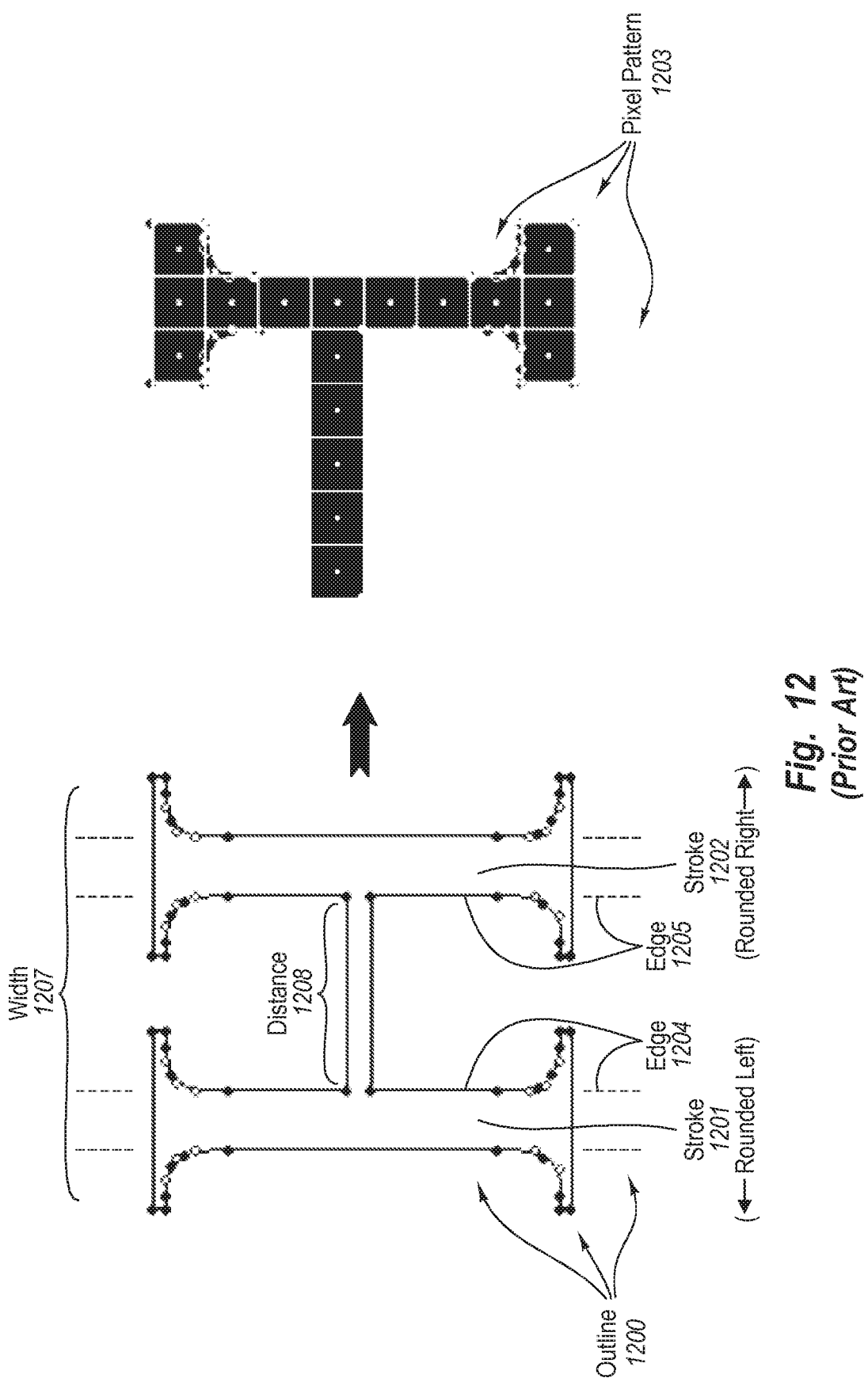
FIG. 12 is a prior art diagram of an outline and a corresponding pixel pattern for a character of text.

FIG. 11 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 11, an example system for implementing the invention includes a general-purpose computing device in the form of computer system 1120, including a processing unit 1121, a system memory 1122, and a system bus 1123 that couples various system components including the system memory 1122 to the processing unit 1121. Processing unit 1121 can execute computer-executable instructions designed to implement features of computer system 1120, including features of the present invention. The system bus 1123 may be any of several types of bus structures including a memory bus or memory controller, a peripheral bus, and a local bus using any of a variety of bus architectures. The system memory includes read only memory ("ROM") 1124 and random access memory ("RAM") 1125. A basic input/output system ("BIOS") 1126, containing the basic routines that help transfer information between elements within computer system 1120, such as during start-up, may be stored in ROM 1124. Functions and instructions of font program 402 can be loaded into RAM 1125 such that the functions and instructions can be called and executed from other portions of font file 401.

The computer system 1120 may also include magnetic hard disk drive 1127 for reading from and writing to magnetic hard disk 1139, magnetic disk drive 1128 for reading from or writing to removable magnetic disk 1129, and optical disk drive 1130 for reading from or writing to removable optical disk 1131, such as, or example, a CD-ROM or other optical media. The magnetic hard disk drive 1127, magnetic disk drive 1128, and optical disk drive 1130 are connected to the system bus 1123 by hard disk drive interface 1132, magnetic disk drive-interface 1133, and optical drive interface 1134, respectively. The drives and their associated computer-readable media provide nonvolatile storage of computer-executable instructions, data structures, program modules, and other data for the computer system 1120. Although the example environment described herein employs magnetic hard disk 1139, removable magnetic disk 1129 and removable optical disk 1131, other types of computer-readable media for storing data can be used, including magnetic cassettes, flash memory cards, digital versatile disks, Bernoulli cartridges, RAMs, ROMs, and the like.

Program code means comprising one or more program modules may be stored on hard disk 1139, magnetic disk 1129, optical disk 1131, ROM 1124 or RAM 1125, including an operating system 1135, one or more application programs 1136, other program modules 1137, and program data 1138. A user may enter commands and information into computer system 1120 through keyboard 1140, pointing device 1142, or other input devices (not shown), such as, for example, a microphone, joy stick, game pad, scanner, or the like. These and other input devices can be connected to the processing unit 1121 through input/output interface 1146 coupled to system bus 1123. Input/output interface 1146 logically represents any of a wide variety of possible interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a Fire Wire interface), or may even logically represent a combination of different interfaces.

A monitor 1147 or other display device is also connected to system bus 1123 via video interface 1148. Monitor 1147 can display monochrome and/or color graphical objects, including text, generated by computer system 1120. Other peripheral devices (not shown), such as, for example, speakers, printers, and scanners, can also be connected to computer system 1120. Printers connected to computer system 1147 can print monochrome and/or color graphical objects, including text, generated by computer system 1120.

Computer system 1120 is connectable to networks, such as, for example, an office-wide or enterprise-wide computer network, a home network, an intranet, and/or the Internet. Computer system 1120 can exchange data with external sources, such as, for example, remote computer systems, remote applications, and/or remote databases over such networks.

Computer system 1120 includes network interface 1153, through which computer system 1120 receives data from external sources and/or transmits data to external sources. As depicted in FIG. 11, network interface 1153 facilitates the exchange of data with remote computer system 1183 via link 1151. Network interface 1153 can logically represent one or more software and/or hardware modules, such as, for example, a network interface card and corresponding Network Driver Interface Specification ("NDIS") stack. Link 1151 represents a portion of a network (e.g., an Ethernet segment), and remote computer system 1183 represents a node of the network.

Likewise, computer system 1120 includes input/output interface 1146, through which computer system 1120 receives data from external sources and/or transmits data to external sources. Input/output interface 1146 is coupled to modem 1154 (e.g., a standard modem, a cable modem, or digital subscriber line ("DSL") modem), through which computer system 420 receives data from and/or transmits data to external sources. As depicted in FIG. 11, input/output interface 1146 and modem 1154 facilitate the exchange of data with remote computer system 1193 via link 1152. Link 1152 represents a portion of a network and remote computer system 1193 represents a node of the network.

While FIG. 11 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

In accordance with the present invention, modules, such as, for example, scaling module 419, hint processor 422, and scan conversion module 424, as well as associated program data, such as, for example, font file 401, scaled glyphs 421, hinted glyphs 426, and pixelated representation 427, can be stored and accessed from any of the computer-readable media associated with computer system 1120. For example, portions of such modules and portions of associated program data may be included in operating system 1135, application programs 1136, program modules 1137 and/or program data 1138, for storage in system memory 1122.

When a mass storage device, such as, for example, magnetic hard disk 1139, is coupled to computer system 1120, such modules and associated program data may also be stored in the mass storage device. In a networked environment, program modules depicted relative to computer system 1120, or portions thereof, can be stored in remote memory storage devices, such as, system memory and/or mass storage devices associated with remote computer system 1183 and/or remote computer system 1193. Execution of such modules may be performed in a distributed environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A system for performing a method for dynamically altering the outline of a graphical object, the system comprising one or more computer processors and computer readable data storage, the system having access to sets of related graphical objects, each set of related graphical objects including outlines representing individual graphical objects from the related set of graphical objects, the system performing the method by executing computer executable instructions upon the one or more processors, the method comprising:

accessing an outline representing a graphical object, the graphical object comprising a stroke pair comprising a first stroke and a second stroke which are similarly oriented;

calculating the width of the first stroke;

calculating the width of the second stroke;

calculating the distance between the first stroke and the second stroke by determining the distance between an edge of the first stroke and a corresponding edge of the second stroke;

determining a location of a center line between the first stroke and the center line;

constraining the calculated distance between the first stroke and the second stroke to mitigate the possibility of rounding errors causing the represented stroke pair to be inappropriately rendered;

based upon the constrained calculated distance between the first stroke and the second stroke, individually constraining the first stroke to be a specified distance from the determined location of center line between the first stroke and the second stroke and individually constraining the second stroke to be a specified distance from the determined location of center line between the first stroke and the second stroke;

adjusting the represented stroke pair in accordance with the constrained calculated distance between the first stroke and the second stroke and the individually constrained distances from the first and second strokes to the location of the center line between the first stroke and the second stroke, including:

calculating a position for a center line for the first stroke;

adjusting one or more control points of the first stroke relative to the calculated center line for the first stroke to mitigate the possibility of rounding errors causing the first stroke width to be inappropriately rendered; and calculating a position for a center line for the second stroke;

adjusting one or more control points of the second stroke relative to the calculated center line for the second stroke to mitigate the possibility of rounding errors causing the second stroke width to be inappropriately rendered;

constraining the adjusted stroke pair between external reference points such that the graphical object is configured for appropriate rendering relative to at least one other graphical object; and rendering the graphical object, including the adjusted constrained stroke pair, at an output device.

2. The system as recited in claim 1, wherein the first and second strokes collectively represent a stroke pair selected from among a horizontal stroke pair, a vertical stroke pair, and diagonal stroke pair.

3. The system as recited in claim 1, wherein calculating the distance between the first stroke and the second stroke comprises determining the black body width of the graphical object.

4. The system as recited in claim 1, wherein calculating the distance between the first stroke and the second stroke comprises determining the distance between a center line of the first stroke and a center line of the second stroke.

5. The system as recited in claim 1, wherein constraining the calculated distance between the first stoke and the second stroke comprises:

determining an appropriate position for a stroke center line between the first stroke and the second stroke based on the width of the first stroke and based on the width of the second stroke; and constraining the position of the first and second strokes relative to the position of the stroke center line.

6. The system as recited in claim 5, wherein determining an appropriate position for a stroke center line comprises calculating the position of a line that is equidistant from a portion of the first stroke and a portion of the second stroke.

7. The system as recited in claim 6, wherein calculating the position of a line that is equidistant from a portion of the first stroke and a portion of the second stroke comprises an act rounding the calculated position of the stroke center line to a full grid position.

8. The system as recited in claim 6, wherein calculating the position of a line that is equidistant from a portion of the first stroke and a portion of the second stroke comprises an act rounding the calculated position of the stroke center line to a half of a grid position.

9. The system as recited in claim 6, wherein calculating the position of a line that is equidistant from a portion of the first stroke and a portion of the second stroke comprises an act rounding the calculated position of the stroke center line in the same direction as stroke center line was rounded for a previously accessed graphical object.

10. The system as recited in claim 1, wherein adjusting one or more control points of the first stroke relative to a calculated center line of the first stroke comprises:

calculating the position of the center line between the edges of the first stroke;

rounding the calculated position of the center line to a grid position based on the calculated target width for the feature; and adjusting the position of control points of the first stroke to comply with the grid position of the center line.

11. The system as recited in claim 1, wherein the adjusting one or more control points of the second stroke relative to a calculated center line of the second stroke comprises:

calculating the position of the center line between the edges of the second stroke;

rounding the calculated position of the center line to a grid position based on the calculated target width for the feature; and adjusting the position of control points of the second stroke to comply with the grid position of the center line.

12. The system as recited in claim 1, wherein constraining the adjusted stroke pair between external reference points comprises constraining the stroke pair relative to a capitalization line.

13. The system as recited in claim 1, wherein constraining the adjusted stroke pair between external reference points comprises constraining the stroke pair relative to a base line.

14. The system as recited in claim 1, wherein constraining the adjusted stroke pair between external reference points comprises constraining the stroke pair relative to side bearing points used to insure proper distancing between graphical objects that are rendered side-by-side.

\* \* \* \* \*